United States Patent
Li et al.

(10) Patent No.: US 10,989,170 B2
(45) Date of Patent: Apr. 27, 2021

(54) CONTROL METHOD FOR ROTOR TURNING DEVICE, COMPUTER PROGRAM PRODUCT, COMPUTER READABLE STORAGE MEDIUM, CONTROL DEVICE, AND ROTOR TURNING SYSTEM

(71) Applicant: JIANGSU GOLDWIND SCIENCE & TECHNOLOGY CO., LTD., Yancheng (CN)

(72) Inventors: Ye Li, Yancheng (CN); Zhu Zhang, Yancheng (CN); Zhongyuan Ge, Yancheng (CN); Tao Sun, Beijing (CN); Xingang Zhang, Yancheng (CN); Xiang Zhao, Beijing (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 420 days.

(21) Appl. No.: 15/773,500

(22) PCT Filed: Jun. 29, 2017

(86) PCT No.: PCT/CN2017/090769
§ 371 (c)(1),
(2) Date: May 3, 2018

(87) PCT Pub. No.: WO2018/040710
PCT Pub. Date: Mar. 8, 2018

(65) Prior Publication Data
US 2018/0328341 A1    Nov. 15, 2018

(30) Foreign Application Priority Data
Aug. 29, 2016  (CN) .......................... 201610783224.3

(51) Int. Cl.
*F03D 17/00* (2016.01)
*F03D 13/10* (2016.01)
(Continued)

(52) U.S. Cl.
CPC ............... *F03D 7/042* (2013.01); *F03D 1/06* (2013.01); *F03D 7/024* (2013.01); *F03D 7/0236* (2013.01);
(Continued)

(58) Field of Classification Search
CPC ................................ F03D 13/10; F03D 80/50
See application file for complete search history.

(56) References Cited

U.S. PATENT DOCUMENTS 8,710,693 B2 * 4/2014 Amano ................... F03D 80/70
                                                    290/55
9,447,776 B2   9/2016 Munk-Hansen
(Continued)

FOREIGN PATENT DOCUMENTS

CN    202370759 U    8/2012
CN    102695875 A    9/2012
(Continued)

OTHER PUBLICATIONS

Extended European Search Report issued by European Patent Office for counterpart Application No. 17845015.1, dated May 14, 2019.
(Continued)

*Primary Examiner* — Justin D Seabe
(74) *Attorney, Agent, or Firm* — Finnegan, Henderson, Farabow, Garrett & Dunner, LLP

(57) ABSTRACT

A rotor rotating device includes at least two rotating units; a movable end of a telescoping cylinder in each rotating unit is provided with a pin; the pin is releasably secured on a rotor. A control method for the rotor rotating device includes: dividing the at least two rotating units into two
(Continued)

groups; first removing pins of a first group of rotating units from the rotor, and then re-securing the pins at another positions on the rotor; and after the pins of all the rotating units are re-secured, changing the state of the telescoping cylinders of all the rotating units, and driving the rotor to turn relative to a machine base. In this way, all the rotating units are sequentially unlocked, moved to a next working station, and re-locked on the rotor. A control device, and a rotor rotating system are further provided.

18 Claims, 16 Drawing Sheets

(51) Int. Cl.
  *F03D 7/04* (2006.01)
  *F03D 80/50* (2016.01)
  *F03D 1/06* (2006.01)
  *F03D 7/02* (2006.01)
(52) U.S. Cl.
  CPC ............ *F03D 13/10* (2016.05); *F03D 17/00* (2016.05); *F03D 80/50* (2016.05); *Y02E 10/72* (2013.01)

(56) References Cited

U.S. PATENT DOCUMENTS

| | | | | |
|---|---|---|---|---|
| 9,464,625 B2* | 10/2016 | Brenner | ................ | F03D 80/00 |
| 10,378,511 B2* | 8/2019 | Knoop | ................ | F03D 80/70 |
| 2006/0196288 A1 | 9/2006 | Aust et al. | | |
| 2012/0137481 A1* | 6/2012 | Lindberg | ................ | F03D 80/50 |
| | | | | 29/23.51 |
| 2012/0181792 A1 | 7/2012 | Pettersen et al. | | |
| 2014/0110949 A1 | 4/2014 | Brenner et al. | | |
| 2014/0224048 A1 | 8/2014 | Munk-Hansen | | |
| 2014/0377062 A1 | 12/2014 | Jakobsen et al. | | |
| 2017/0051722 A1 | 2/2017 | Knoop | | |

FOREIGN PATENT DOCUMENTS

| | | | |
|---|---|---|---|
| CN | 103502635 A | | 1/2014 |
| CN | 203627104 U | | 6/2014 |
| CN | 103982377 A | | 8/2014 |
| CN | 104234928 A | | 12/2014 |
| CN | 105673349 A | | 6/2016 |
| CN | 106438197 A | | 2/2017 |
| CN | 106762438 A | | 5/2017 |
| GB | 2535331 A | | 8/2016 |
| JP | 2011-163324 | | 8/2011 |
| JP | 2011-163324 A | | 8/2011 |
| KR | 101346178 B1 | * | 12/2013 |
| WO | WO 2015/169605 A1 | | 11/2015 |

OTHER PUBLICATIONS

International Search Report issued in International Application No. PCT/CN2017/090769, mailed from the State Intellectual Property Office of China dated Sep. 22, 2017.

Office Action issued in corresponding Chinese Patent Application No. 201610783224.3, dated Nov. 27, 2018.

* cited by examiner

# CONTROL METHOD FOR ROTOR TURNING DEVICE, COMPUTER PROGRAM PRODUCT, COMPUTER READABLE STORAGE MEDIUM, CONTROL DEVICE, AND ROTOR TURNING SYSTEM

CROSS-REFERENCE TO RELATED APPLICATIONS

The present application is the national phase of International Application No. PCT/CN2017/090769, titled "CONTROL METHOD FOR ROTOR TURNING DEVICE, COMPUTER PROGRAM PRODUCT, COMPUTER READABLE STORAGE MEDIUM, CONTROL DEVICE, AND ROTOR TURNING SYSTEM", filed on Jun. 29, 2017, which claims priority to Chinese patent application No. 201610783224.3 titled "CONTROL METHOD AND CONTROL DEVICE FOR ROTOR ROTATING DEVICE, AND ROTOR ROTATING SYSTEM", filed with the Chinese State Intellectual Property Office on Aug. 29, 2016, the entire disclosures of which are incorporated herein by reference.

FIELD

This application relates to the technical field of wind power generation, and particularly to a control method and a control device for a rotor rotating device, and a rotor rotating system.

BACKGROUND

A wind power generator is an electric power device that converts wind energy into mechanical energy and convert the mechanical energy into electrical energy. The principle of wind power generation is to use wind power to drive the blades of a windmill to rotate, thus achieving power generation of the generator.

The wind power generator includes a nacelle, a generator, a blade and other major components. The generator includes a rotor and a stator. A main shaft of the rotor is provided with a hub. The blade is installed on the hub of the rotor to receive the wind power and drive the rotor to rotate, which in turn drive the rotor of the generator to rotate, thus a stator winding of the generator is brought to cut magnetic lines of force to generate the electrical energy.

At least one blade is provided, and generally three blades are preferably provided. In the case that the number of the blades is more than one, the position of the hub is required to be changed to meet assembly requirements of different blades. That is, after completing the assembly of one blade, the hub at this position is required to rotate by a certain angle to another position, and then assembly of another blade is carried out. Also, in the case that the blade is repaired or maintained, it is also required to adjust the blade to allow the blade to be at an appropriate angle.

At present, adjustment of the position of the blade is mainly achieved by driving of a rotating device in the wind power generator. The rotating device is fixed to the stator, and the rotating device may drive the rotor to rotate with respect to the stator and further drive the hub connected to a rotor shaft to rotate, thus achieving the adjustment of the position of the blade.

At present, the rotating device achieves the shift from an installation position of one blade to an installation position of another blade by pushing the rotor many times to allow the rotor to rotate. When a previous push is switched to a next push by the rotating device, the position of the rotor is required to be locked by a locking component, and when the rotating device is rotated to a next pushing position to be connected to the rotor, the locking component and the rotor are released, which results in low rotation efficiency.

Therefore, a technical issue to be addressed by the person skilled in the art is to simplify control of the rotating device and improve the rotation efficiency of the rotor.

SUMMARY

In order to solve the technical issues described above, a control method for a rotor rotating device is provided according to the present application, and the control method includes:

a grouping step, dividing at least two rotating units into two groups;

a moving step, first detaching each of pins of a first group of rotating units from a rotor and re-fixing each of the pins of the first group of rotating units to another position on the rotor, pins of a second group of rotating units being maintained fixedly connected to the rotor during detached and re-fixed process of the pins of the first group of rotating units;

repeating the grouping step and the moving step, to allow the pins of all the rotating units to be re-fixed; and changing the state of each of telescopic cylinders of all the rotating units to drive the rotor to rotate with respect to a generator base.

The pins of the rotating units in the present application are not disengaged from the rotor at the same time, but a part of the pins are in a locked state together with the rotor while another part of the pins are disengaged from the rotor. In this way, the rotating units in the rotating device are unlocked, moved to the next working positions and re-locked together with the rotor in sequence, and in the whole process, a part of the pins are always in the locked state together with the rotor, thus avoiding reverse rotation of the rotor.

In addition, a control device for the rotor rotating device is further provided according to the present application, and the control device includes:

a grouping unit configured to divide at least two rotating units into two groups;

a moving unit configured to control each of pins of a first group of rotating units so as to allow each of the pins of the first group of rotating units to be detached from a rotor first and then re-fixed to another position on the rotor, and pins of a second group of rotating units being maintained fixedly connected to the rotor during detached and re-fixed process of the pins of the first group of rotating units;

a cycle unit configured to repeatedly call the grouping unit and the moving unit so as to allow the pins of all the rotating units to be re-fixed; and a drive unit configured to change a state of each of telescopic cylinders of all the rotating units for driving the rotor to rotate with respect to a generator base.

In addition, a rotor rotating system is further provided according to the present application, which includes a rotor rotating device and a control device as described above, specifically, the rotor rotating device includes at least two rotating units, and a movable end of a telescopic cylinder of each of the rotating units is provided with a pin, and the pin is disengageably fixed to the rotor, and the control device is configured to control the at least two rotating units to drive the rotor to rotate with respect to a generator base.

In addition, a rotor rotating system is further provided according to the present application, which includes a rotor rotating device and a control device, specifically, the rotor rotating device includes at least two rotating units, and a movable end part of a telescopic cylinder of the rotating unit is provided with a pin, and the pin is disengageably fixed to a rotor, and the control device includes a memory and a processor, specifically, the memory is configured to store execution instructions, and the processor is configured to call the execution instructions in the memory to perform the steps as described hereinabove, for controlling the at least two rotating units to drive the rotor to rotate with respect to a generator base.

In addition, a computer program product used in combination with a rotor rotating device of a wind power generator set is further provided according to the present application, and the computer program includes a computer readable storage medium and a computer program embedded in the computer readable storage medium. The computer program is configured to perform the steps as described hereinabove.

In addition, a computer readable storage medium is further provided according to the present application. The computer readable storage medium is configured to store a computer program, and the computer program is configured to perform the steps as described hereinabove.

The rotor rotating system according to the present application may unlock multiple groups of rotating units one time, and may enable the group of the locked rotating units to have a large force arm for resisting a bending moment generated by gravity of a blade and a wind load, thus reducing a fixing force provided by the locked pins and thus reducing deformation of the rotor. On the premise of ensuring safety of the rotor during rotation, the pushing efficiency of the rotating unit can be improved.

Figure 1:
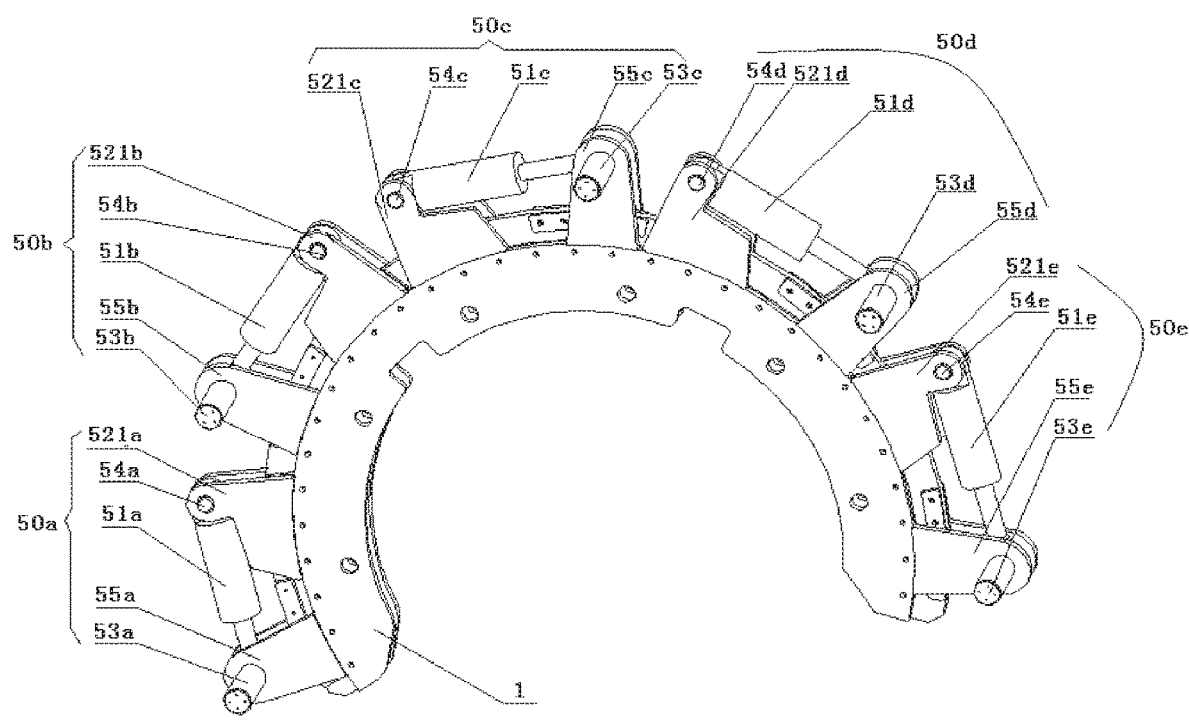
FIG. 1 is a schematic view showing the structure of a rotor rotating device of a wind power generator set according to an embodiment of the present application.

Reference Numerals in FIGS. 1 to 3, FIGS. 6 to 10 and FIG. 16:

| | |
|---|---|
| 1. annular base, | 27. generator base, |
| 28. rotor, | 28a. pin hole, |
| 29. pin shaft, | 31. blade, |
| 32. hub, | 50, 50a, 50b, 50c, 50d, 50e: rotating unit, |
| 51, 51a, 51b, 51c, 51d, 51e: telescopic cylinder, | 522. body, |
| 521, 521a, 521b, 521c, 521d, 521e: hinge seat, | 52. installation seat, |
| 53, 53a, 53b, 53c, 53d, 53e: pin, | |
| 54, 54b, 54c, 54d, 54e: hinge pin shaft, | |
| 55, 55a, 55b, 55c, 55d, 55e: support plate, | |
| a, b, c, d, e: pin hole, | |
| 150. rotor rotating system, | 151. rotor rotating device, |
| 152. control device, | 1531. angle detection unit, |
| 1532. bending moment detection unit, | 1533. wind load detection unit, |
| 11. grouping unit, | 12. moving unit, |
| 13. cycle unit, | 18. sensor interface, |
| 101. moment acquiring module, | 102. first number determining module, |
| 103. force arm calculating module, | 104. selection module, |
| 105. angle acquiring module, | 106. second number determining module, |
| 107. wind load acquiring module, | 108. third number determining module, |
| 121. first drive module, | 122. second drive module. |

DETAILED DESCRIPTION OF EMBODIMENTS

In order to make the person skilled in the art have a better understanding of a solution of the present application, the present application is described hereinafter in further detail in conjunction with the drawings and embodiments.

Figure 2:
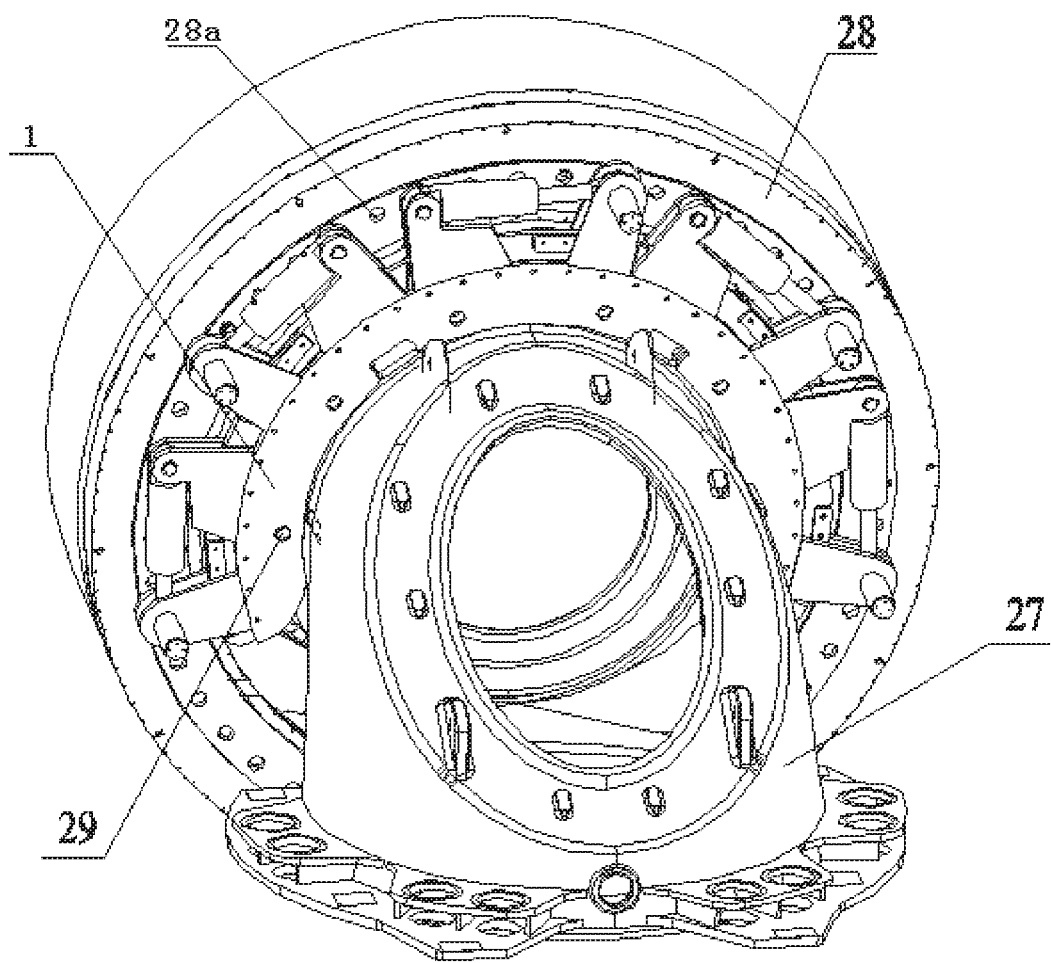
FIG. 2 is a partial schematic view showing the structure of the device shown in FIG. 1 installed to a wind power generator.
Figure 3:
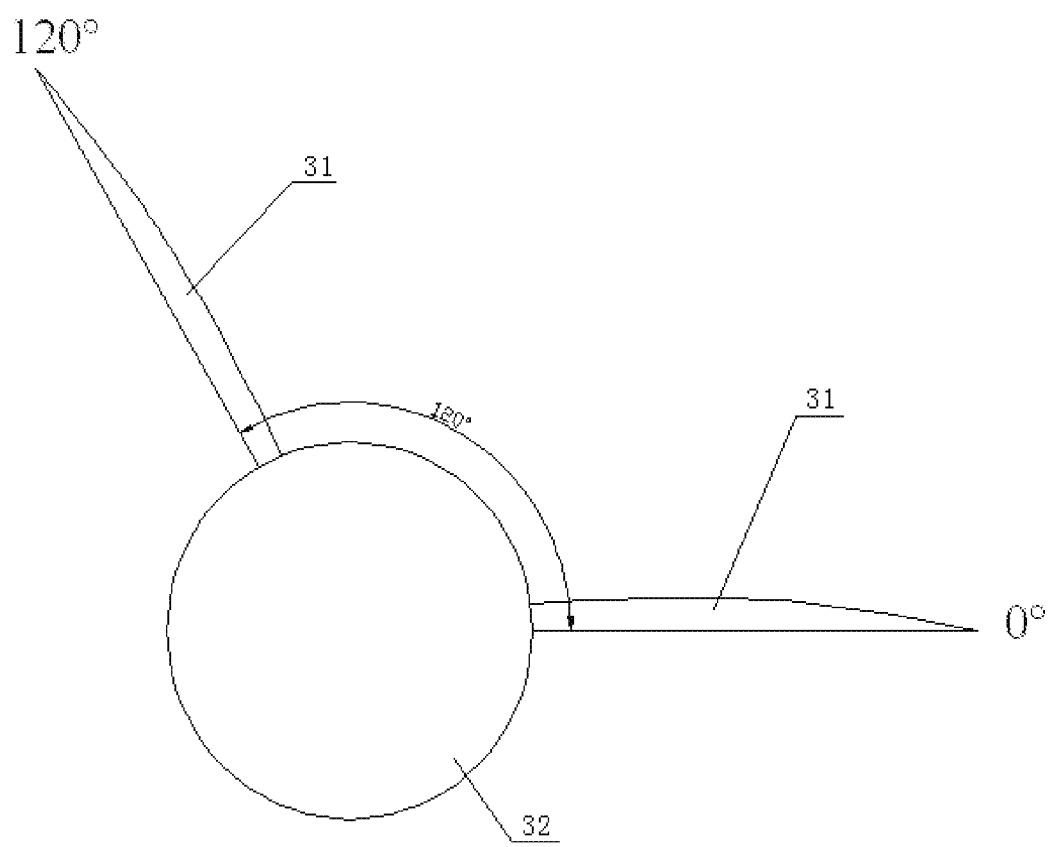
FIG. 3 is a partial schematic view showing the structure of only two blades installed to a hub.

Referring to FIGS. 1 to 3, a wind power generator includes a nacelle, a rotor 28 and a stator. A hub 32 is connected to a rotating shaft of the rotor 28. A blade 31 is installed to the hub 32. At least one blade is provided. Generally, three blades 31 are preferably provided, and the three blades 31 are distributed evenly in a circumferential direction of the hub 32, that is, an angle between two adjacent blades 31 is 120 degrees. The following control method is described herein by taking the three blades 31 distributed evenly in the circumferential direction as an example. There are two main arrangements of the rotor and the stator in the wind power generator: a first arrangement with an inner rotor and an outer stator, and a second arrangement with an outer rotor and an inner stator. The technical solution is continued to be described herein by taking a generator with an outer rotor and an inner stator as an example, of course, the application of the technical solution in a generator with an inner rotor and an outer stator is not excluded herein.

Permanent magnets of magnetic steel are arranged circumferentially on an inner wall of the rotor 28, a winding is arranged around an outer peripheral wall of the stator, and the stator is installed in the rotor 28. The stator is fixedly installed to a stator bracket, and the stator bracket is fixedly connected to a generator base 27 located at an upper end of a tower.

Specifically, the nacelle is installed at the upper end of the tower, and the nacelle is circumferentially connected to the tower rotatably. An upper end part of the tower extends into the nacelle.

Figure 16:
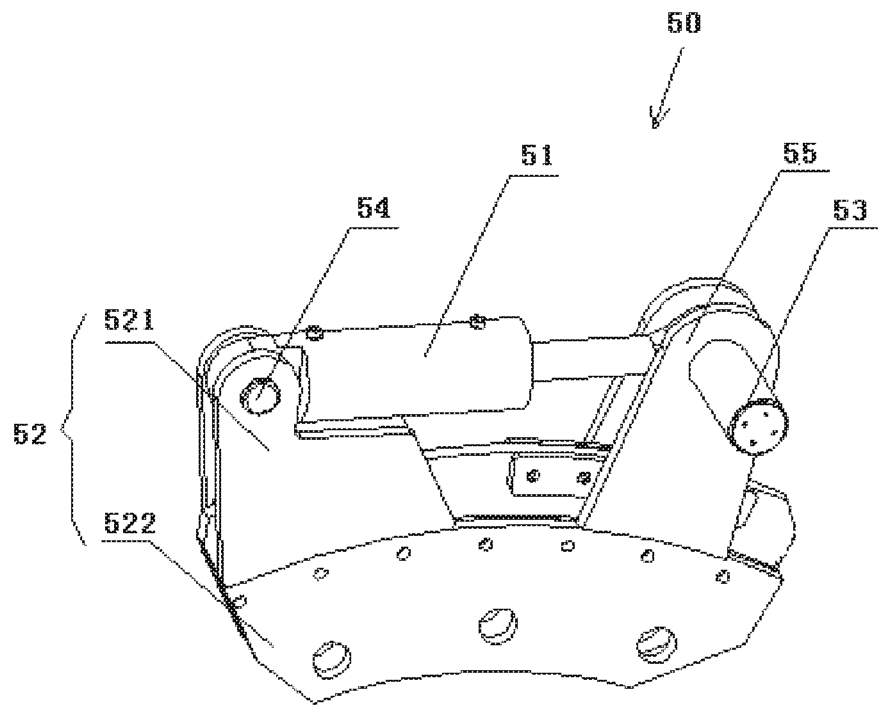
FIG. 16 is a schematic view showing the structure of a rotating unit according to an embodiment of the present application.

As shown in FIG. 16, a rotating device of a wind power generator set according to the present application includes at least two rotating units 50. Each rotating unit 50 preferably includes a telescopic cylinder 51 and an installation seat 52. The telescopic cylinder 51 may be a hydraulic cylinder or an air cylinder. The hydraulic cylinder is preferably selected as the telescopic cylinder herein.

The rotating unit 50 further includes a pin 53. Driven by hydraulic pressure or pneumatic pressure, the pin 53 may be extended or retracted. The pin 53 may be locked by a pin hole 28a of the rotor 28 when the pin 53 is extended, and the pin 53 may be disengaged from the pin hole 28a when the pin 53 is retracted.

The installation seat 52 mainly functions to connect a fixed end of the telescopic cylinder 51 to the generator base 27 of the wind power generator. The generator base 27 is located at the upper end of the tower to provide a support platform for installation of other components in the nacelle. Typically, the fixed end of the telescopic cylinder 51 is connected to the installation seat 52, and the installation seat 52 may be appropriately set depending on a connection structure of the fixed end of the telescopic cylinder 51 with the installation seat 52. The telescopic cylinder 51 may also be connected to the installation seat 52 by a hinge pin shaft 54, i.e., the installation seat is provided with a hinge seat 521, and the fixed end of the telescopic cylinder 51 is hinged to the hinge seat 521.

Further, the installation seat 52 according to the present application is detachably connected to the generator base 27, that is, both the telescopic cylinder 51 and the generator base 27 are detachably connected by the installation seat 52.

The installation seat 52 is detachably connected to the generator base 27, and the installation seat 52 specifically includes a body 522, and the hinge seat 521 is arranged on the body 522. The fixed end of the telescopic cylinder is hinged to the hinge seat 521. The installation seat 52 is further provided with a support plate 55. A movable end of the telescopic cylinder is detachably connected to the support plate 55 and the support plate 55 is configured to slide to and fro with respect to the body 522, and the pin 53 is arranged on the support plate 55.

In this way, when the rotating unit is in operation, the installation seat 52 is fixed to the generator base 27, and the pin 53 extends into the pin hole of the rotor 28. When the support plate 55 is driven by the telescopic cylinder 51 to slide circumferentially with respect to the body 522 of the installation seat, the pin 53 is moved synchronously along with the support plate to further drive the rotor 28 to rotate.

The pin 53 is provided at the movable end of the telescopic cylinder, and is configured to cooperate with a pin hole of a side wall of the rotor 28 to be locked or unlocked. Specifically, as shown in FIG. 2, a side wall, facing the generator base 27, of the rotor 28 is provided with a pin hole 28a. Space between two adjacent pin holes may be selected appropriately depending on an actual application environment.

In the case that the rotor rotating device in the present application is for installation or maintenance of the blade, first, the fixed end of the telescopic cylinder 51 is fixedly connected to the generator base 27 of the wind power generator by the installation seat 52, and the movable end of the telescopic cylinder is fixed to the rotor 28 by using the pin 53, that is, the pin at the movable end of the telescopic cylinder is arranged in the pin hole 28a of the side wall of the rotor 28. Next, stroke movement of the telescopic cylinder 51 is controlled, and the telescopic cylinder 51 is driven to extend or retract, and the movable end of the telescopic cylinder may drive the rotor 28 to rotate circumferentially via the pin 53, thus, the rotor 28 is driven to rotate with respect to the generator base 27. The rotor 28 is rotated so as to drive the hub fixed to the rotating shaft to rotate, and the rotor 28 is finally rotated to a position suitable for the installation or maintenance of the blade.

Moreover, by controlling a drive source of the telescopic cylinder, the telescopic cylinder 51 may be locked in a certain operating state, and thus a position of the pin 53 and a position of the rotor 28 are locked. The position of the rotor 28 may be locked without providing an additional locking device, which improves safety of installation and maintenance of the blade and facilitates simplification of the mechanism.

After completing the installation or maintenance of the blade, since the fixed end of the telescopic cylinder is detachably connected to the generator base 27 by the installation seat 52, the installation seat 52 may be detached from the generator base 27 and the pin 53 may be disengaged from the pin hole 28a of the rotor 28, that is, the pin 53 and the movable end of and the telescopic cylinder may be separated from the rotor 28, and finally the rotating unit 50 is separated from the wind power generator. That is, the rotor rotating device for the wind power generator set herein is independent of the wind power generator, which can reduce an overall weight of the wind power generator.

In the case of a large rotation angle, the rotation angle required by the rotor 28 may not be reached even if the telescopic cylinder is extended to a maximum length. In this case, the telescopic cylinder may be driven to extend and retract for many times to drive the rotor 28 to rotate to an intended angle. Herein, one extending process or one retracting process of the telescopic cylinder is referred to as one stroke. That is, the telescopic cylinder may carry out the stroke movement for many times to drive the rotor 28 to rotate to the intended angle.

Taking the case where the telescopic cylinder is extended to push the rotor 28 to rotate as an example, after the telescopic cylinder is extended (a first stroke), the pin 53 is required to disengage from the pin hole 28a, and then the telescopic cylinder is retracted to return to an initial length (a second stroke), and then the pin 53 is inserted into a corresponding pin hole 28a of the rotor 28, and the telescopic cylinder is driven to extend (a third stroke) for continuing to push the rotor 28 to rotate.

The pins 53 of the rotating units herein are not disengaged from the rotor 28 at the same time, but a part of the pins together with the rotor 28 are in a locked state while other pins are disengaged from the rotor 28. In this way, the rotating units in the rotating device are unlocked, moved and re-locked with the rotor in sequence. In the whole process, a part of the pins together with the rotor 28 are always in the locked state, so as to avoid uncontrolled rotation of the rotor 28.

Specifically, a group of rotating unit may include one rotating unit, or may include two or more rotating units, as long as the rotor 28 can be reliably locked in the process that part of the rotating units are moved to the next working positions to be relocked with the rotor 28. A detailed control strategy for five rotating units is provided hereinafter, which is described hereinafter in detail.

As shown in FIG. 1, the bodies 522 of the installation seats of at least two rotating units are connected to form an annular base 1. The annular base 1 may be substantially semi-annular and has an opening facing the generator base 27 so as to fit with a support shaft located on the generator base 27. This facilitates installation of the annular base 1 to the generator base 27. The annular base 1 may be installed to the generator base 27 by a pin shaft 29. In order to facilitate installation from an opening above the nacelle, optionally a radian range of the annular base 1 ranges from 170 degrees to 220 degrees.

The present application is not limited thereto, and the radian range of the annular base 1 may range from 90 degrees to 360 degrees as long as the telescopic cylinder may provide a drive force sufficient to drive the rotor to rotate.

In the case that a hydraulic pump has a constant pressure, a thrust force generated when the telescopic cylinder is extended is greater than a pulling force generated when the telescopic cylinder is retracted. Therefore, when designing the rotating unit, preferably, the telescopic cylinder is extended from a retracted state to push the rotor 28 to rotate. However, it is inevitable during actual operation that a rotation position of the rotor 28 is deviated and then the rotor 28 is required to rotate by a certain angle in a reverse direction for correcting. In order to quickly achieve correction of the position of the rotor 28 during rotation, the rotating units herein may be arranged as follows.

As shown in FIG. 1, according to orientations of the telescopic cylinders 51 of the rotating units along a circumferential direction of the generator base 27, all the rotating units may be divided into a first part and a second part. The telescopic cylinders of the first part of rotating units and the telescopic cylinders of the second part of rotating units are arranged oppositely. As the rotor 28 is driven to rotate, the telescopic cylinders of the first part of rotating units are gradually extended, and the telescopic cylinders of the second part of rotating units are gradually retracted, thereby driving the rotor 28 to rotate in a first direction. Alternatively, the telescopic cylinders of the first part of rotating units are gradually retracted, and the telescopic cylinders of the second part of rotating units are gradually extended, thereby driving the rotor 28 to rotate in a second direction. The second direction is opposite to the first direction.

That is, the telescopic cylinders of the first part of rotating units and the telescopic cylinders of the second part of rotating units have different moving tendencies in the process that the rotor 28 is driven to rotate, i.e., in the process that the telescopic cylinders are configured to drive the rotor 28 to perform one rotation, the telescopic cylinders may be divided into two parts with a first part of the telescopic cylinders in a gradually extended state and a second part of the telescopic cylinders in a gradually retracted state.

In the case that the rotor 28 is driven to rotate in the first direction, the first part of telescopic cylinders enables fast rotation of the rotor 28. In the case that the rotor 28 requires position correction toward the second direction, the second part of telescopic cylinders are switched to the gradually extended state to achieve fast correction of the position of the rotor 28 towards an opposite direction. Moreover, in this embodiment, when the rotor 28 is driven to rotate, the telescopic cylinders of a part of the rotating units are controlled in the gradually extended state (for providing the thrust force for the rotor 28), and the telescopic cylinders of another part of the rotating units are controlled in the gradually retracted state (for providing the pulling force for the rotor 28), which also facilitates improving adaptability to sudden conditions and safety during the installation of the blade.

Hereinafter, a process when the rotor is driven by the rotating device to rotate is described by taking a rotating device having five rotating units as an example. As shown in FIG. 1, a rotor rotating device includes five rotating units arranged along a semi-annular circumference in sequence. For convenience of description, the five rotating units are defined, from left to right, as a first rotating unit 50a, a second rotating unit 50b, a third rotating unit 50c, a fourth rotating unit 50d, and a fifth rotating unit 50e. The structure of each of the five rotating units is as shown in FIG. 3, and the bodies of the installation seats of the five rotating units are connected together to form an annular base 1.

The telescopic cylinder of the first rotating unit 50a is defined as a first telescopic cylinder 51a. By analogy, the telescopic cylinders are defined, in sequence from left to right, as a second telescopic cylinder 51b, a third telescopic cylinder 51c, a fourth telescopic cylinder 51d, and a fifth telescopic cylinder 51e. Similarly, the pins are defined, in sequence from left to right, as a first pin 53a, a second pin 53b, a third pin 53c, a fourth pin 53d, and a fifth pin 53e. The pins are connected to a first support plate 55a, a second support plate 55b, a third support plate 55c, a fourth support plate 55d, and a fifth support plate 55e, respectively.

Similarly, the hinge seats are defined in sequence from left to right as a first hinge seat 521a, a second hinge seat 521b, a third hinge seat 521c, a fourth hinge seat 521d and a fifth hinge seat 521e. Hinge shaft pins shown in FIG. 1, by which the hinge seats are connected to corresponding telescopic cylinders, are defined from left to right as a first hinge shaft pin 54a, a second hinge shaft pin 54b, a third hinge shaft pin 54c, a fourth hinge shaft pin 54d, and a fifth hinge shaft pin 54e.

In the process that the rotor 28 is driven to rotate, the first telescopic cylinder 51a and the second telescopic cylinder 51b have the same moving state, and the third telescopic cylinder 51c to the fifth telescopic cylinder 51e have the same moving state.

The process when the rotor 28 is driven by the rotating units to rotate anticlockwise is described hereinafter with reference to the example of FIG. 1. Before operation, the first pin 53a to the fifth pin 53e are respectively placed in corresponding pin holes of the side wall of the rotor 28, and the annular base 1 is fixed to the generator base 27. At the initial state, the first telescopic cylinder 51a and the second telescopic cylinder 51b are in a retracted state, and the third telescopic cylinder 51c to the fifth telescopic cylinder 51e are in an extended state.

In the process that the rotor 28 is driven to rotate anticlockwise, the first telescopic cylinder 51a and the second telescopic cylinder 51b are gradually extended, thus the first telescopic cylinder 51a and the second telescopic cylinder 51b are switched from the retracted state to the extended state to apply an anticlockwise thrust force to the rotor by using the pins 53a and 53b. And the third telescopic cylinder 51c to the fifth telescopic cylinder 51e are gradually retracted, thus the third telescopic cylinder 51*c* to the fifth telescopic cylinder 51*e* are switched from the extended state to the retracted state to apply an anticlockwise pulling force to the rotor by using the pins 53*c*, 53*d* and 53*e*, for driving the rotor 28 to rotate anticlockwise together. One stroke action completed by each of the telescopic cylinders can drive the rotor 28 to rotate by approximately 7.5 degrees.

The rotating units may be unlocked one by one, or two or more rotating units as a group may be unlocked together. It is well known that, if the number of the rotating units unlocked one time is greater, a working efficiency of the rotating device is higher, and moreover the force acting on the pin of the rotating unit is larger and thus a safety performance of the rotating device is relatively poorer. Therefore, in order to improve a pushing efficiency of the rotating unit as much as possible on the premise of ensuring the safety of the rotor during rotation, a control method and a control system for a rotor rotating unit are provided hereinafter.

Figure 15A:
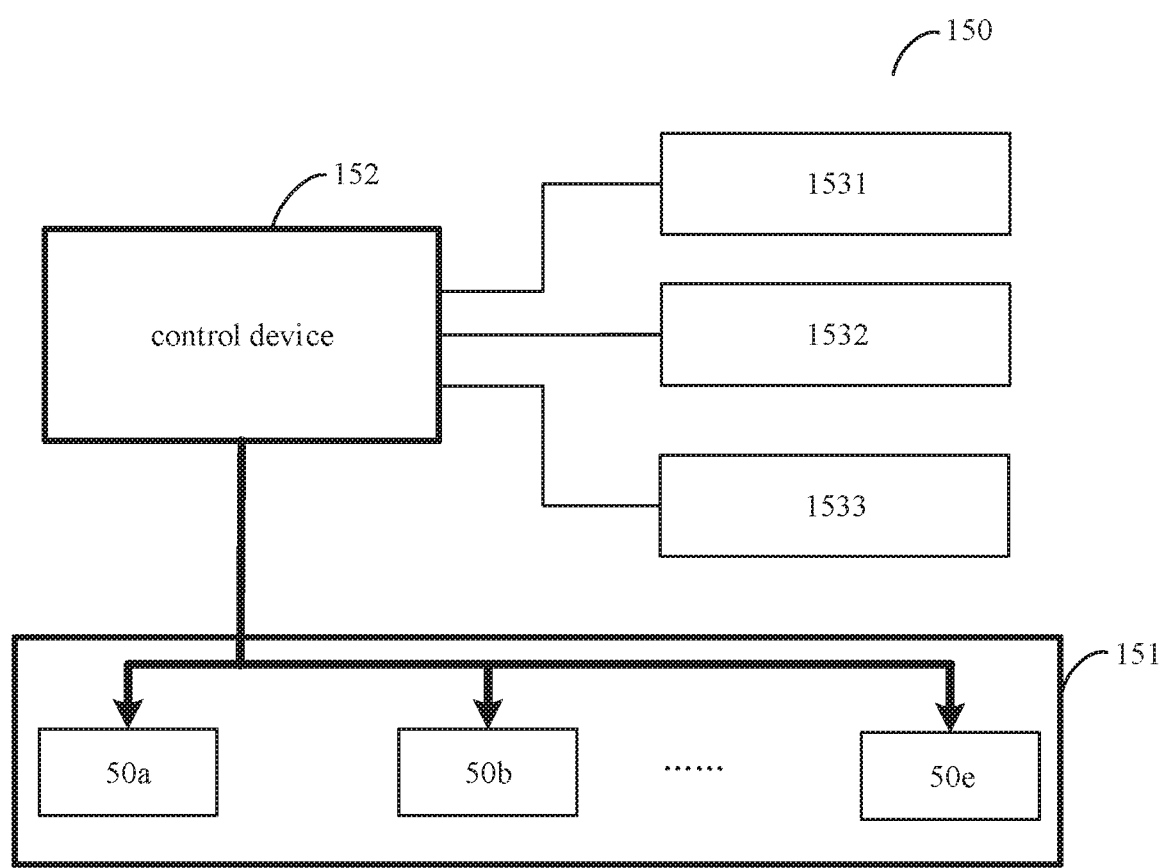
FIG. 15a is a block diagram showing the structure of a rotor rotating system according to an embodiment of the present application.

Reference is made to FIG. 15*a* which is a block diagram showing the structure of a rotor rotating system according to an embodiment of the present application. The rotor rotating system 150 includes a rotor rotating device 151 and a control device 152. The structure of the rotor rotating device 151 may be the structure according to the embodiment shown in FIG. 1, for example.

The control device 152 is configured to control at least two rotating units 50 to drive the rotor 28 to rotate with respect to the generator base 27.

Optionally, the rotor rotating system 150 further includes an angle detection unit 1531, a bending moment load detection unit 1532, and a wind load detection unit 1533. The angle detection unit 1531 includes a rotation angle measurer provided on the rotor 28 or the hub, and the rotation angle measurer is configured to detect the rotation angle of the rotor 28 in a current state. The bending moment load detection unit 1532 includes a pressure sensor provided on the pin 53, and the pressure sensor is configured to detect a shear force to which the pin 53 is subjected. The wind load detection unit 1533 includes an anemoscope configured to detect an external wind speed.

The angle detection unit 1531, the bending moment load detection unit 1532 and the wind load detection unit 1533 are connected to the control device 152 by respective interfaces.

Figure 11:
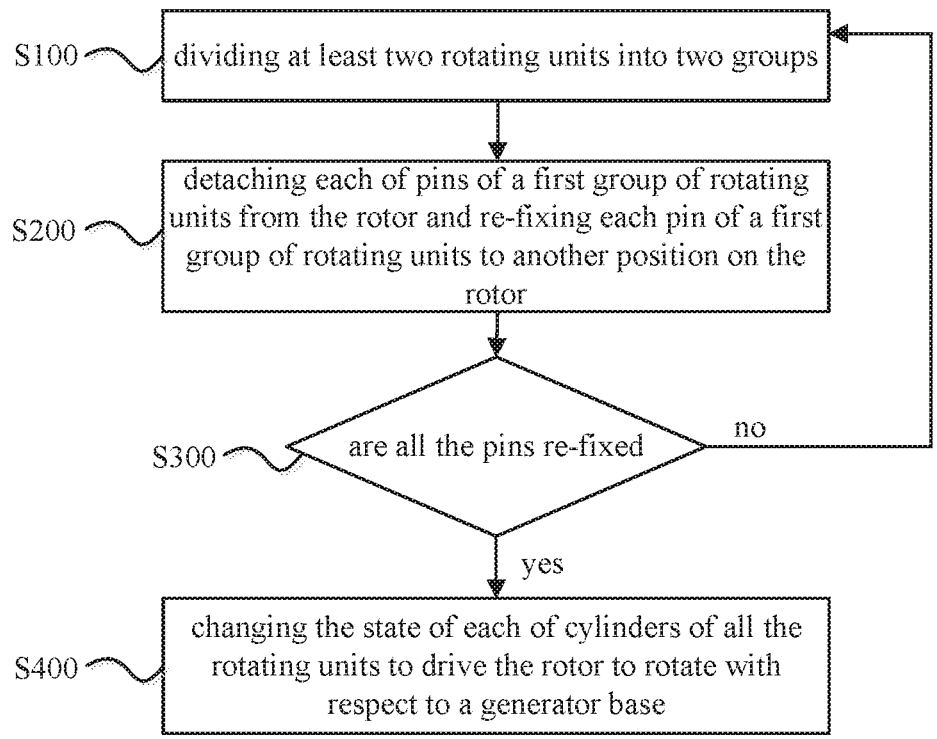
FIG. 11 is a flow chart of a control method for the rotor rotation device according to an embodiment of the present application.

Referring to FIG. 11, the control method according to the present application includes steps S100, S200, S300, S400.

In step S100, i.e., a grouping step, the at least two rotating units 50 are divided into two groups.

In step S200, i.e., a moving step, each of the pins 53 of a first group of rotating units 50 is first detached from the rotor 28 and then re-fixed to another position on the rotor 28, and the pins 53 of a second group of rotating units 50 are maintained fixedly connected to the rotor 28 in the detached and re-fixed process of the pins 53 of the first group of rotating units 50.

In step S300, it is determined whether the pins 53 of all the rotating units 50 are re-fixed or not. If the pins 53 are not all re-fixed, step S100 and step S200 are repeated. If the pins 53 are all re-fixed, after the pins 53 of all the rotating units 50 are re-fixed, step S400 is performed to allow the state of each of the telescopic cylinders 51 of all the rotating units 50 to be changed, for driving the rotor 28 to rotate with respect to the generator base 27.

It should be noted herein that, according to the moving states of the rotating units during an unlocking process, all the rotating units are divided into two groups, of which a first group of rotating units is defined as a group of unlocked rotating units and a second group of rotating units is defined as a group of locked rotating units. That is, in the process that the pins 53 of the first group of rotating units are detached from the rotor 28 and re-fixed to the rotor 28, the pins 53 of the second group of rotating units are fixedly connected to the rotor 28.

Specifically, in the moving step (S200), the pins 53 of the telescopic cylinders 51 of the first group of rotating units are driven to disengage from the pin holes 28*a* of the rotor 28, and the pins 53 of the telescopic cylinders 51 of the second group of rotating units are maintained fixedly connected to the rotor 28.

The telescopic cylinders 51 of the first group of rotating units are driven to retract or extend, to allow the pin 53 of each of the telescopic cylinders 51 in the first group of rotating units to be moved to and fixed into another pin hole 28*a* in the rotor 28.

Specifically, in step S100, in a first embodiment, all the rotating units can be grouped based on a bending moment load to which the rotor is subjected and a shear load to which each locking component may be subjected. A specific grouping method is as follows, including steps S1 and S2.

In step S1, the bending moment load to which the rotor 28 is subjected in the current state is acquired.

Optionally, the bending moment load detection unit 1532 may include a pressure sensor arranged on the pin 53, and the pressure sensor is configured to detect a shear force to which the pin 53 is subjected. The bending moment load detection unit 1532 is configured to calculate the bending moment load to which the rotor 28 is subjected in the current state based on the shear force to which each of the pins 53 is subjected and a force arm of each of the pins 53.

Specifically, the bending moment load to which each of the pins 53 is subjected may be calculated, and the bending moment loads to which all the pins 53 are subjected are summed.

In step S2, the number of the rotating units in each group is determined in conjunction with the bending moment load to which the rotor is subjected in the current state and a shear load of the single pin.

Figure 12:
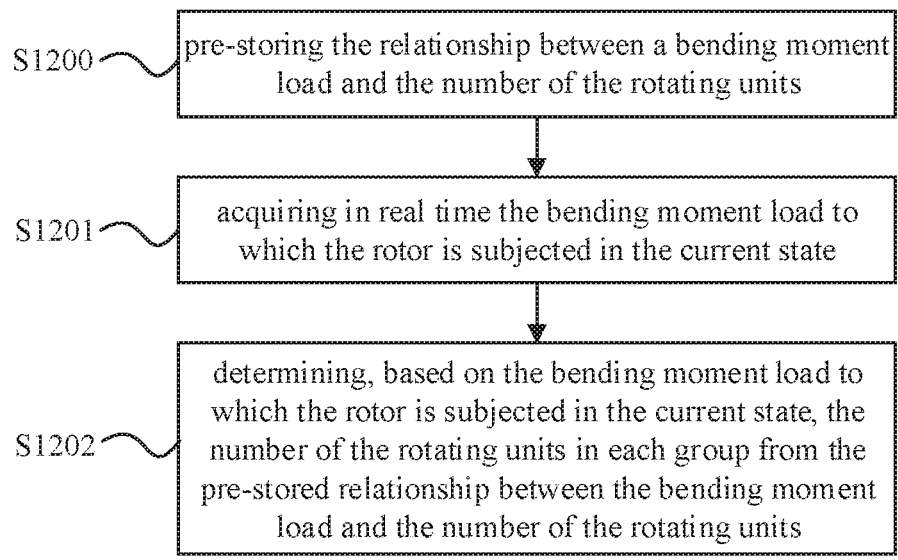
FIG. 12 is a flow chart of a first example of a grouping step according to the present application.

Referring to FIG. 12, in order to improve a calculation efficiency of grouping of the rotating units as much as possible, the steps in the above embodiment may be specifically described hereinafter.

In step S1200, a relationship between the bending moment load and the number of the rotating units is pre-stored in a control unit.

In step S1201, the bending moment load to which the rotor is subjected in the current state is detected in real time.

In step S1202, the number of the rotating units in each group is determined, based on the bending moment load to which the rotor is currently subjected, from the pre-stored relationship between the bending moment load and the number of the rotating units.

The control method can increase a rotation efficiency of the rotor and may be further determine the number of the locking components in each group according to the change in load of the rotor during rotation.

Figure 4:
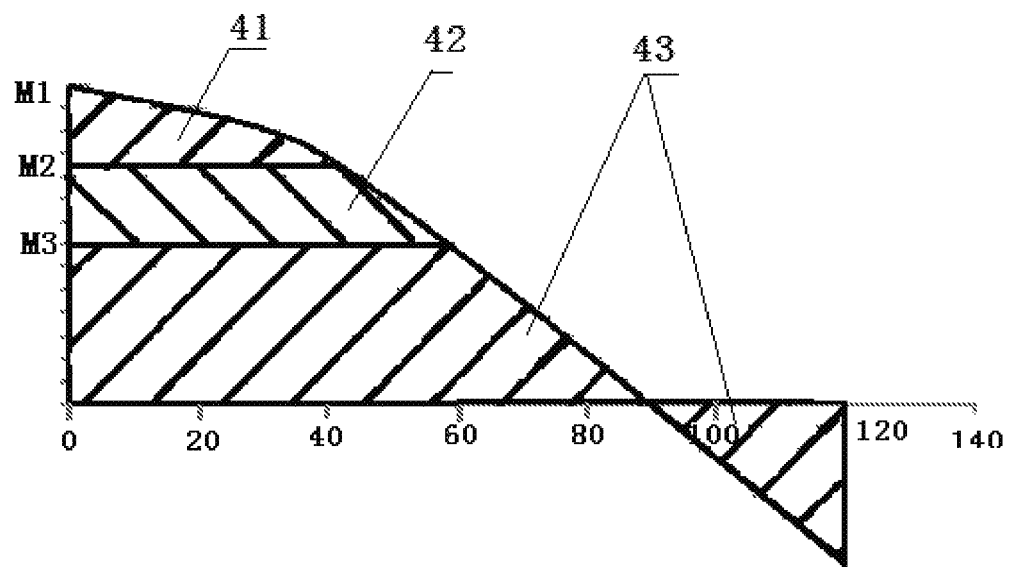
FIG. 4 is a schematic view showing a varying relationship between a rotation angle and a rotor bending moment during rotation from an installation position of one blade to an installation position of another blade according to an embodiment of the present application.

Referring to FIG. 4, an abscissa represents the rotation angle and an ordinate represents a rotor bending moment, for example:

in the case that the detected bending moment load of the rotor ranges from M2 to M1 (within an interval 41), one pin is disengaged each time, and four pins are maintained in the locked state in the whole process;

in the case that the detected bending moment load of the rotor ranges from M3 to M2 (within an interval 42), two pins are disengaged each time, and three pins are maintained in the locked state in the whole process; and in the case that the detected bending moment load of the rotor is less than M3 (within an interval 43), three pins may be disengaged each time, and two pins are maintained in the locked state in the whole process.

In addition to the method described above, another control method for grouping all the rotating units is further provided hereinafter, and the control method is specifically described as follows, including steps S1300, S1301, S1302.

Figure 13:
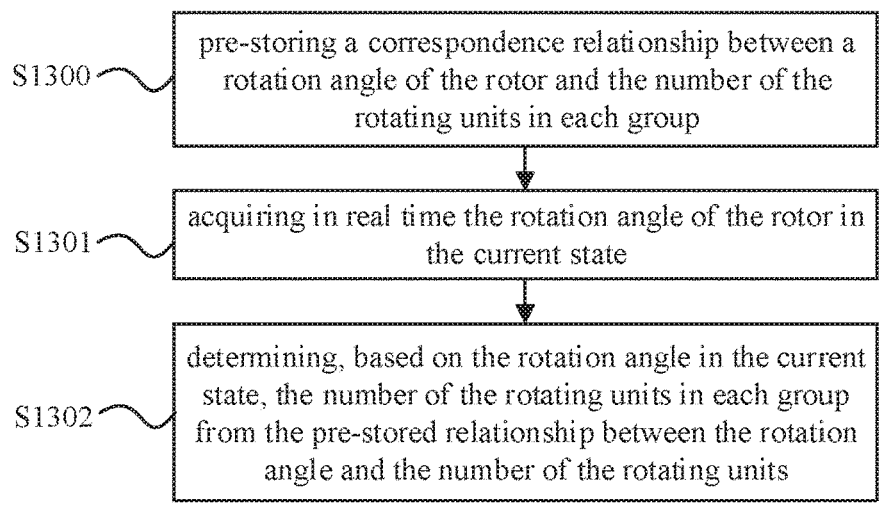
FIG. 13 is a flow chart of a second example of the grouping step according to the present application.

Referring to FIG. 13, in a second embodiment, the rotating units are grouped according to the rotation angle of the rotor, that is, the rotation angle of the rotor in the current state is acquired and the number of the rotating units in each group is determined based on the rotation angle of the rotor in the current state. Specifically, as shown in FIG. 13, the control method may be performed in the following steps.

In step S1300, a correspondence relationship between the rotation angle of the rotor and the number of the rotating units in each group is pre-stored in a control unit.

In step S1301, the rotation angle of the current state rotor is detected in real time.

Measurement of the rotation angle of the rotor may be taken by the angle measurement unit 1531 which may be a rotation angle measurer.

In step S1302, the number of the rotating units in each group is determined, based on the rotation angle of the rotor in the current state, from the pre-stored relationship between the rotation angle and the number of the rotating units.

Figure 5:
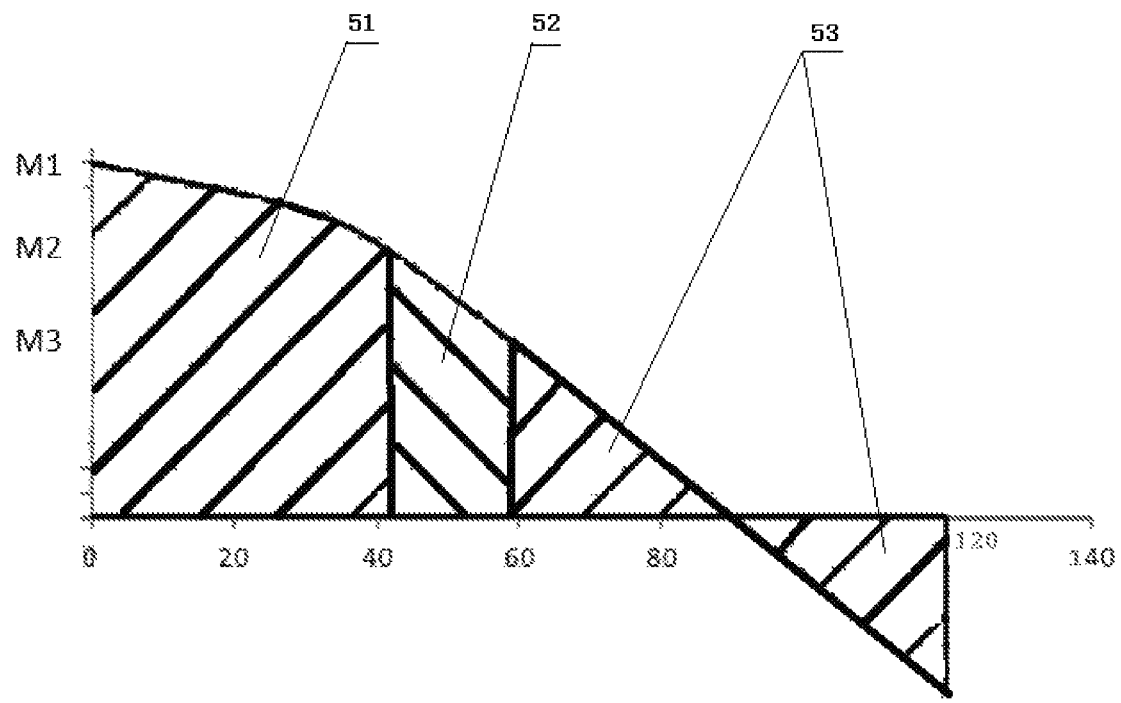
FIG. 5 is a schematic view showing a varying relationship between a rotation angle and a rotor bending moment during rotation from an installation position of one blade to an installation position of another blade according to another embodiment of the present application.

For example, in an embodiment with reference to FIG. 5, an abscissa represents the rotation angle, and an ordinate represents the rotor bending moment. In the case that the rotation angle of the rotor ranges from 0 to 42 degrees (within an interval 51), one pin is disengaged each time, and four pins are maintained in a locked state in the whole process.

In the case that the rotation angle ranges from 42 degrees to 58 degrees (within an interval 52), two pins are disengaged each time, and three pins are maintained in a locked state in the whole process.

In the case that the rotation angle ranges from 58 degrees to 120 degrees (within an interval 53), three pins may be disengaged each time, and two hydraulic pins are maintained in a locked state in the whole process.

The bending moment control method according to the first embodiment has a high calculation accuracy, but takes a long time for calculation. The rotation angle control method according to the second embodiment has a low calculation accuracy, but takes a short time for the calculation. In order to balance the calculation accuracy and the calculation efficiency, the following control method for grouping the rotating units is further provided hereinafter.

Figure 14:
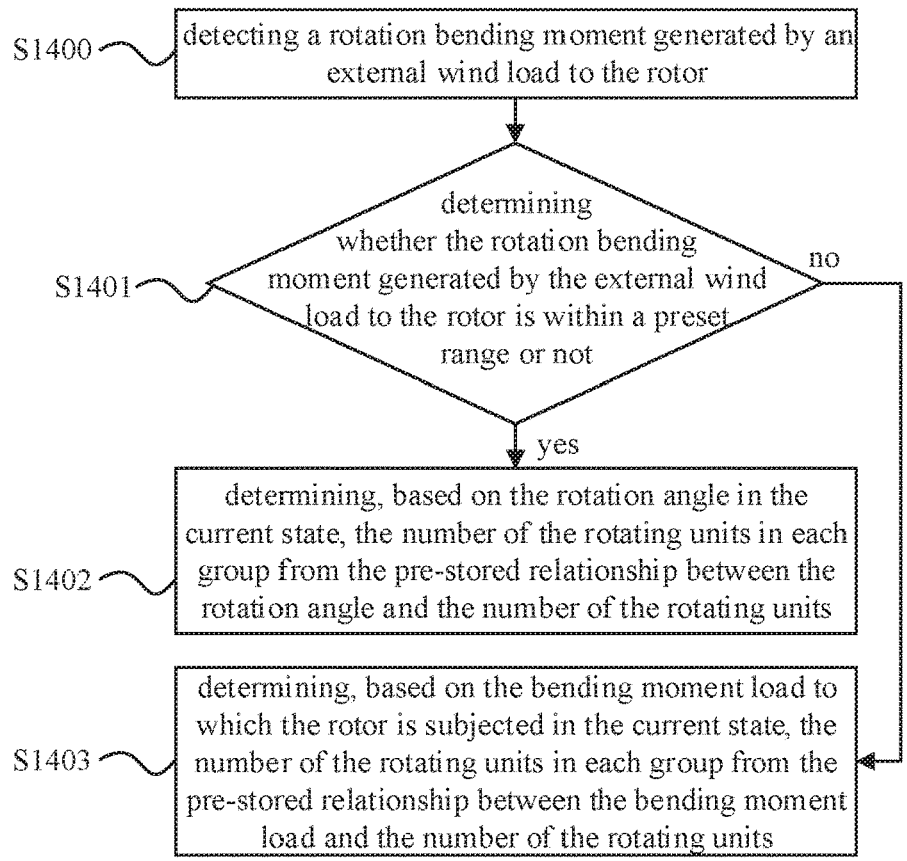
FIG. 14 is a flow chart of a third example of the grouping step according to the present application.

Referring to FIG. 14, in a third embodiment, the rotating units are grouped by taking two parameters, i.e., the rotation bending moment to which the rotor is subjected and the rotation angle of the rotor, into account together, and the process of grouping includes steps S1400, S1401, S1402, and S1403.

In step S1400, the rotation bending moment generated by an external wind load to the rotor is acquired. The wind load refers to the pressure of wind to which the blade is subjected in a direction perpendicular to the direction of air flow. For example, the wind load detection unit 1533 includes an anemoscope configured to measure an external wind speed and is configured to calculate the rotation bending moment generated by the external wind load to the rotor based on the external wind speed.

In step S1401, it is determined whether the rotation bending moment generated by the external wind load to the rotor is within a preset range or not. If the rotation bending moment is within the preset range, the process of grouping proceeds to step S1402. If the bending moment generated by the wind load exceeds the preset range, the process of grouping proceeds to step S1403.

In step S1402, the number of the rotating units in each group is determined, based on the rotation angle of the rotor in the current state, from the pre-stored relationship between the rotation angle of the rotor and the number of the rotating units.

In step S1403, the number of the rotating units in each group is determined, based on the bending moment load to which the rotor is subjected in the current state, from the pre-stored relationship between the bending moment load and the number of the rotating units.

The preset range in step S1401 of the above embodiment may be from K1P to K2P, where $0 \leq K1 < K2 < 1$, and P indicates a barring load. The so-called barring load is a load for driving the rotor to rotate.

In the third embodiment, both the bending moment load to which the rotor is subjected and the rotation angle of the rotor are taken into account. During barring process, in the case that a wind force acting on the blade has little influence on grouping by calculating based on the rotation angle, the rotating units are grouped by calculating based on the rotation angle, so as to determine the number and the positions of the pins to be disengaged. In the case that the wind force acting on the blade has a great influence on grouping by calculating based on the rotation angle, the rotating units may be grouped by calculation based on the bending moment, so as to determine the number and the positions of the pins to be disengaged. This can not only ensure the accuracy of data, but also can reduce processing amount of the data, thereby improving the calculation efficiency.

In the above embodiments, when the rotor is rotated, the bending moment load is resisted by the pins, and if the force acting on each of the pins is controlled to be the same during rotation of the rotor, the value of the force is the value obtained through dividing the load generated by gravity of the blades by the number of the pins.

If the force arm of the pin in the locked state to a rotation center is greater, the pin has a lower shear stress and the rotor has a smaller deformation accordingly. If the force arm of the pin in the locked state to the rotation center is shorter, the rotor has a larger deformation.

Therefore, in order to reduce the influence of fixing effect of the pin in the locked state on the deformation of the rotor as much as possible, a preferred grouping and unlocking sequence of the rotating units is provided herein, and is specifically described hereinafter.

In a preferred embodiment, a method for grouping according to the magnitude of the force arm is provided. First, the force arm of the pin 53 of each of the rotating units 50 to a rotation center of the rotor 28 is calculated; and then, all the unlocked rotating units are grouped according to the number of the rotating units in each group, and a group of rotating units, in which the sum of the force arms of the locking components to the rotation center is minimum after grouping, are selected to be unlocked first. That is, the sum of the force arms from the pins 53 of the first group of rotating units (i.e., the group of the unlocked rotating units) to the rotation center of the rotor 28 is minimized. That is, those pins which are subjected to the largest shear force are unlocked first.

Figure 6:
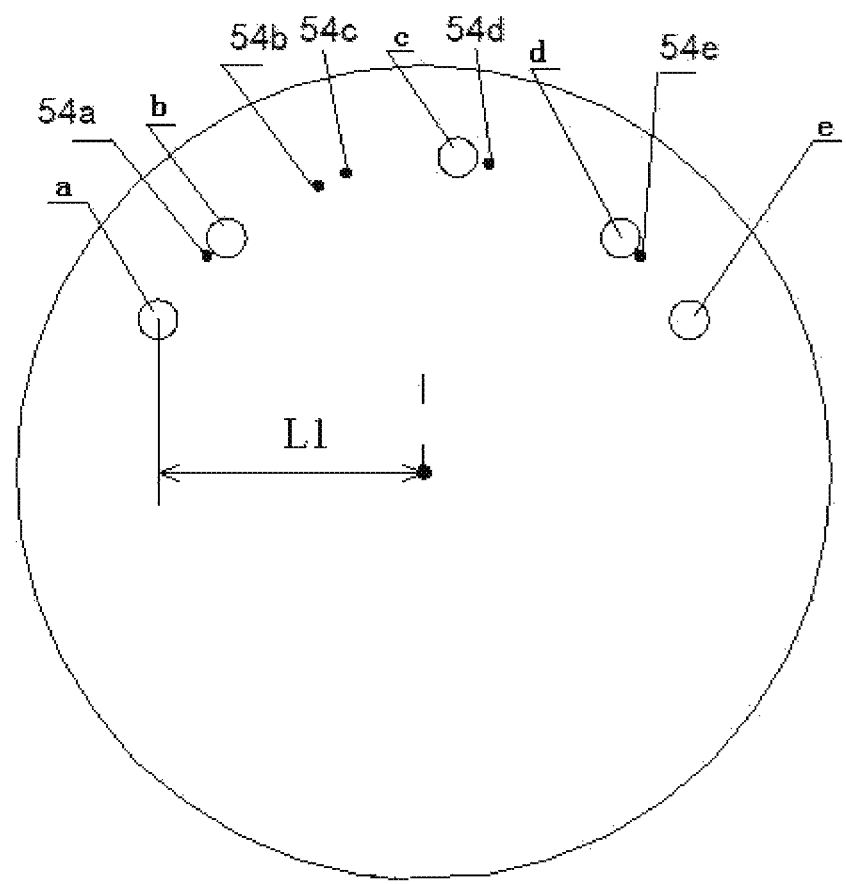
FIGS. 6 to 10 show pin holes provided in the rotor and configured to cooperate with a first pin to a fifth pin.
Figure 7:
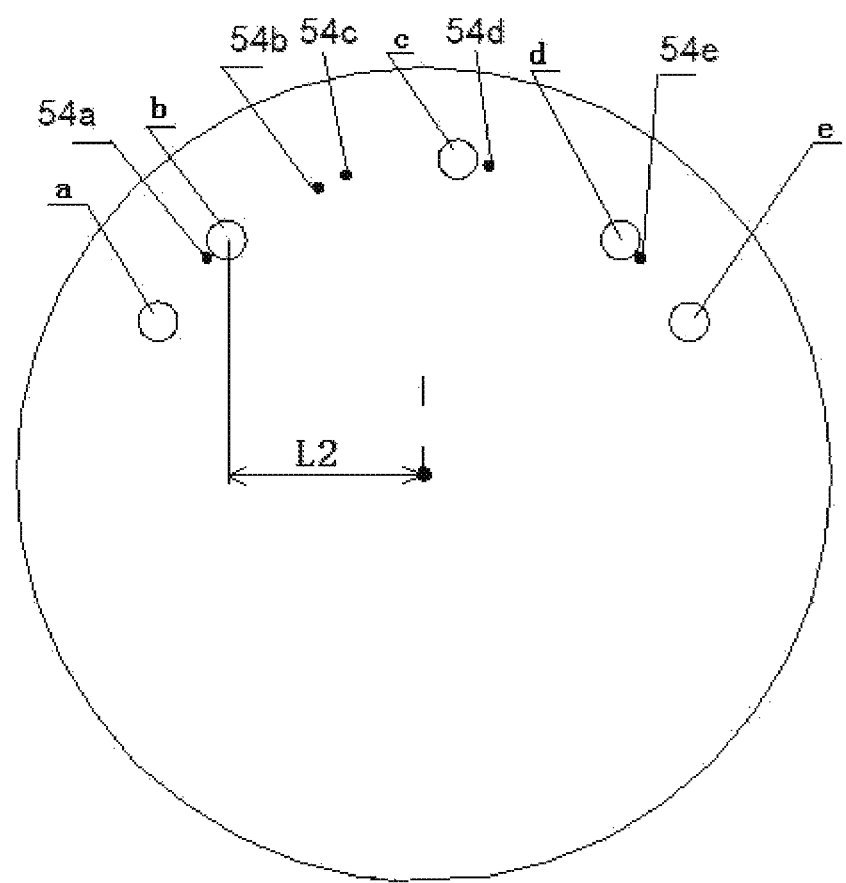
Figure 8:
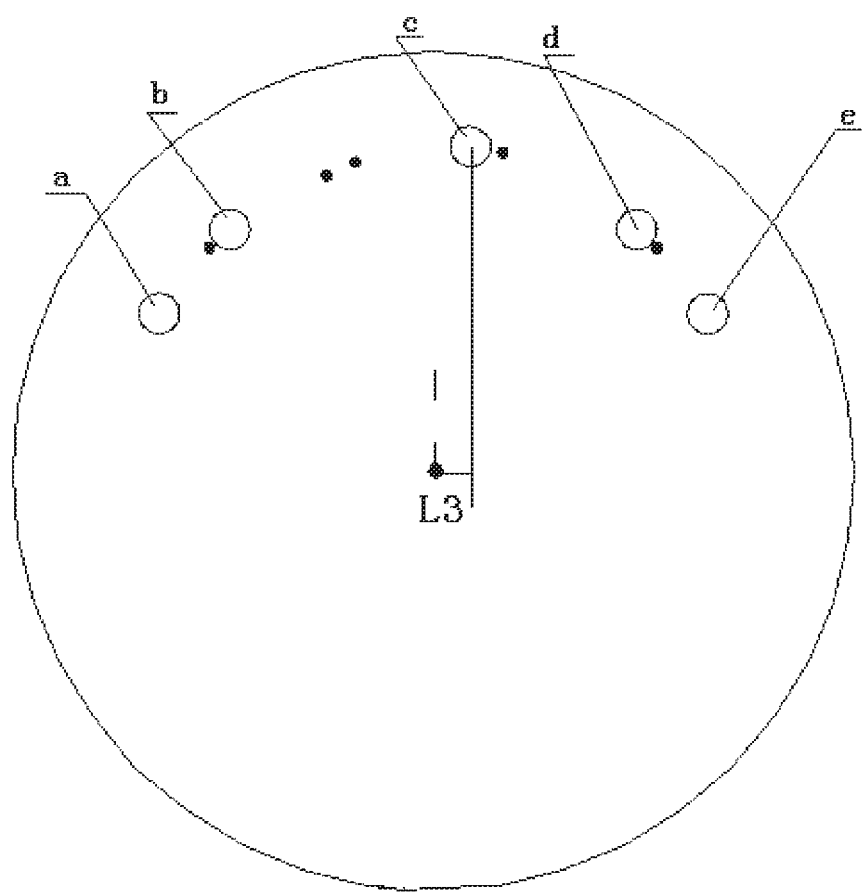
Figure 9:
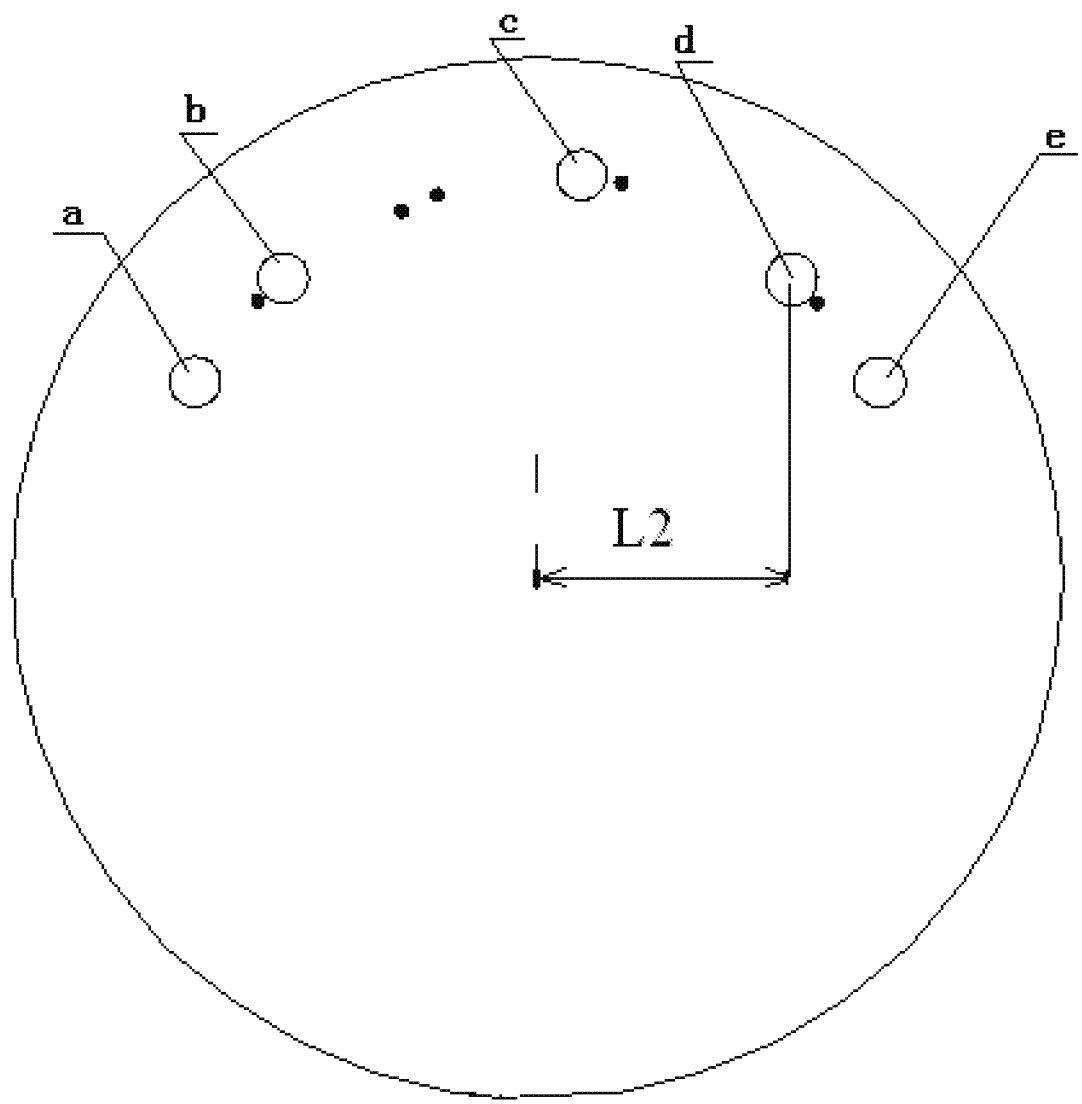
Figure 10:
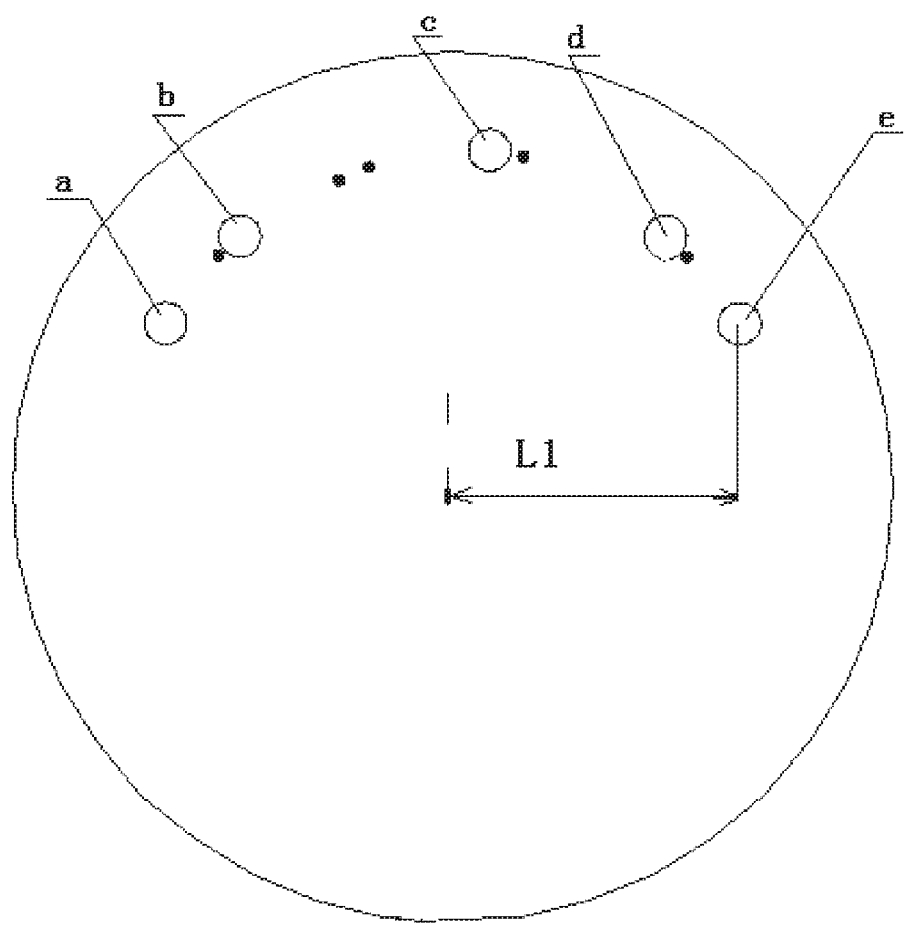

Similarly, by taking the five rotating units shown in FIG. 1 as an example, the pin holes in the rotor, which are configured to cooperate with the first pin 53a to the fifth pin 53e, are shown in FIGS. 6 to 10, and the pin holes are respectively indicated by a, b, c, d, e. The hinge shaft pins 54a to 54e are also shown in FIGS. 6 and 7. When the pins and the rotor are in an initial locked state, the force arms, that is, locking force arms, of the first pin 53a to the fifth pin 53e to the rotation center of the rotor are respectively L1, L2, L3, L2, L1, where L1>L2>L3.

In the case that the rotating units are disengaged in sequence, that is, one pin is disengaged each time, the other four rotating units are in a state of being locked by the pins, and since the third pin 53c has a minimum force arm, the third pin 53c is unlocked first, and then the pin 53b or the fourth pin 53d is unlocked, and finally the first pin 53a or the fifth pin 53e is unlocked. In this case, the third rotating unit 50c constitutes the first group of rotating units 50, and the first rotating unit 50a, the second rotating unit 50b, the fourth rotating unit 50d and the fifth rotating unit 50e constitute the second group of rotating units 50.

In the case that the first pin 53a or the fifth pin 53e is disengaged, the sum of the locking force arms of the pins is L1+2L2+L3. In the case that the second pin 53b is disengaged, the sum of the locking force arms of the pins is 2L1+L2+L3. In the case that the third pin 53c is disengaged, the sum of the locking force arms of the pins is 2L1+2L2. In the case that the fourth pin 53d is disengaged, the sum of the locking force arms of the pins is 2L1+L2+L3.

In the case that two pins are disengaged one time, i.e., two rotating units constitute a group, it may be seen from the above description that, in the case of a combination of the third pin 53c with the second pin 53b or the fourth pin 53d, the sum of the force arms of the pins in the combination to the rotation center of the rotor is L3+L2, which is less than the sum of the force arms of the pins in other combinations of two pins to the rotation center of the rotor, thus, the third pin 53c and the second pin 53b are disengaged first as a combination, or the third pin 53c and the fourth pin 53d are first disengaged as a combination.

In this case, the second rotating unit 50b and the third rotating unit 50c constitute the first group of rotating units 50, and the first rotating unit 50a, the fourth rotating unit 50d and the fifth rotating unit 50e constitute the second group of rotating units 50.

Alternatively, the third rotating unit 50c and the fourth rotating unit 50d constitute the first group of rotating units 50, and the first rotating unit 50a, the second rotating unit 50b and the fifth rotating unit 50e constitute the second group of rotating units 50.

In the case that three pins are disengaged one time, that is, three rotating units constitute a group, it may be seen from the above description that, in the case that the second pin 53b, the third pin 53c and the fourth pin 53d constitute a group, the sum of the force arms of the second pin 53b, the third pin 53c and the fourth pin 53d in the group is less than the sum of the force arms of the pins in all other combinations formed by three pins, thus, the second pin 53b, the third pin 53c and the fourth pin 53d are disengaged first as a group.

In this case, the second rotating unit 50b, the third rotating unit 50c and the fourth rotating unit 50d constitute the first group of rotating units 50, and the first rotating unit 50a and the fifth rotating unit 50e constitute the second group of rotating units 50.

It may be further seen from the above description that, a disengaging principle of the pins is that: the second group of rotating units (i.e., the group of locked rotating units) is enabled to have a larger force arm for resisting the bending moment generated by the gravity of the blades and the wind load, so as to reduce the fixing force provided by the locked pin and thus reduce the deformation of the rotor.

In the above embodiments, power for extending or retracting of the pin may come from a drive component, that is, the rotating unit may further include a drive component configured to drive the pin to extend or retract, to allow to the pin to extend into or disengage from the pin hole of the rotor. In the case that the pin is a hydraulic pin, the drive component is hydraulic oil. In the case that the pin is a pneumatic pin, the drive component is compressed air.

Although a specific structure of the drive component is not shown herein, this does not hinder understanding and implementation of the technical solution herein by the person skilled in the art.

A specific configuration of the control device 152 is described hereinafter.

Figure 15B:
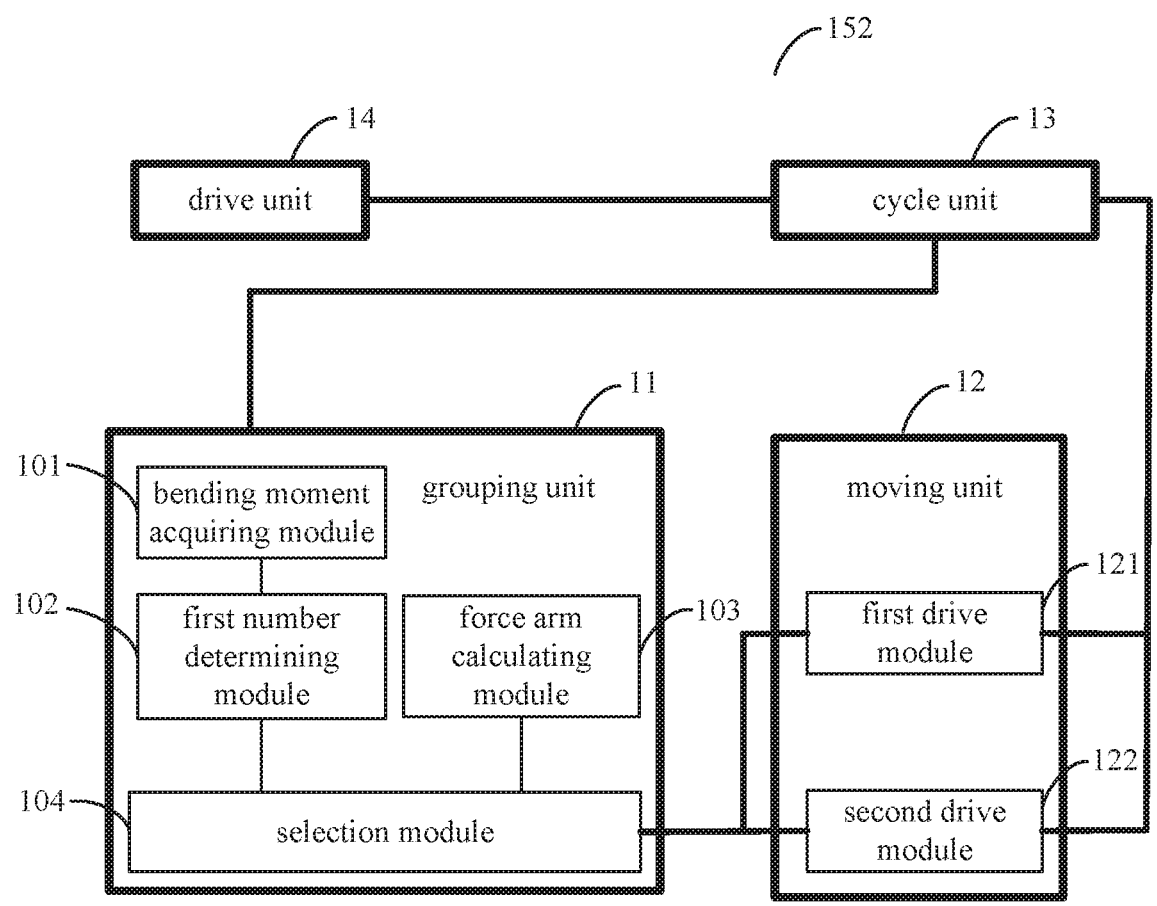
FIG. 15b is a block diagram showing the structure of a control device 152 according to an embodiment of the present application.

In a preferred embodiment, as shown in FIG. 15b, the control device 152 includes a grouping unit 11, a moving unit 12, a cycle unit 13, and a drive unit 14.

The grouping unit 11 is configured to divide the at least two rotating units 50 into two groups.

The moving unit 12 is configured to control each of the pins 53 of the first group of rotating units 50 to allow each of the pins 53 of the first group of rotating units 50 to be detached from the rotor 28 first and then re-fixed to another position on the rotor 28, and in the process that the pins 53 of the first group of rotating units 50 are detached and re-fixed, the pins 53 of the second group of rotating units 50 are maintained fixedly connected to the rotor 28.

The cycle unit 13 is configured to repeatedly call the grouping unit and the moving unit, to allow the pins 53 of all the rotating units 50 to be re-fixed.

The drive unit 14 is configured to change the state of each of the telescopic cylinders 51 of all the rotating units 50 for driving the rotor 28 to rotate with respect to the generator base 27.

Optionally, the grouping unit 11 includes a bending moment acquiring module 101, a first number determining module 102, a force arm calculating module 103, and a selection module 104.

The bending moment determining module 102 is configured to acquire the bending moment load to which the rotor 28 is subjected in the current state. The first number determining module 102 is configured to determine the number of the rotating units 50 in each group based on the bending moment load to which the rotor 28 is subjected in the current state and the shear load of each pin 53.

The force arm calculating module 103 is configured to calculate the force arm of each of the pins 53 of the rotating units 50 to the rotation center of the rotor 28.

The selection module 104 is configured to select the rotating units as the first group of rotating units 50 and the second group of rotating units 50 according to the number of the rotating units 50 in each group and configured to minimize the sum of the force arms of the pins 53 of the rotating units 50 in the first group of rotating units to the rotation center of the rotor 28.

For example, the selection module 104 may select the rotating units as the first and second groups of rotating units according to an example described in FIGS. 6 to 10.

The moving unit 12 includes a first drive module 121 and a second drive module 122. The first drive module is configured to drive the pins 53 of the first group of rotating units 50 to disengage from the pin holes of the rotor 28, and the pins 53 of the second group of rotating units 50 are maintained fixedly connected to the rotor 28. The second drive module is configured to drive the telescopic cylinders 51 of the first group of rotating units 50 to retract or extend, to allow each of the pins 53 of the first group of rotating units 50 to be moved to and fixed into another pin hole in the rotor 28.

Figure 15C:
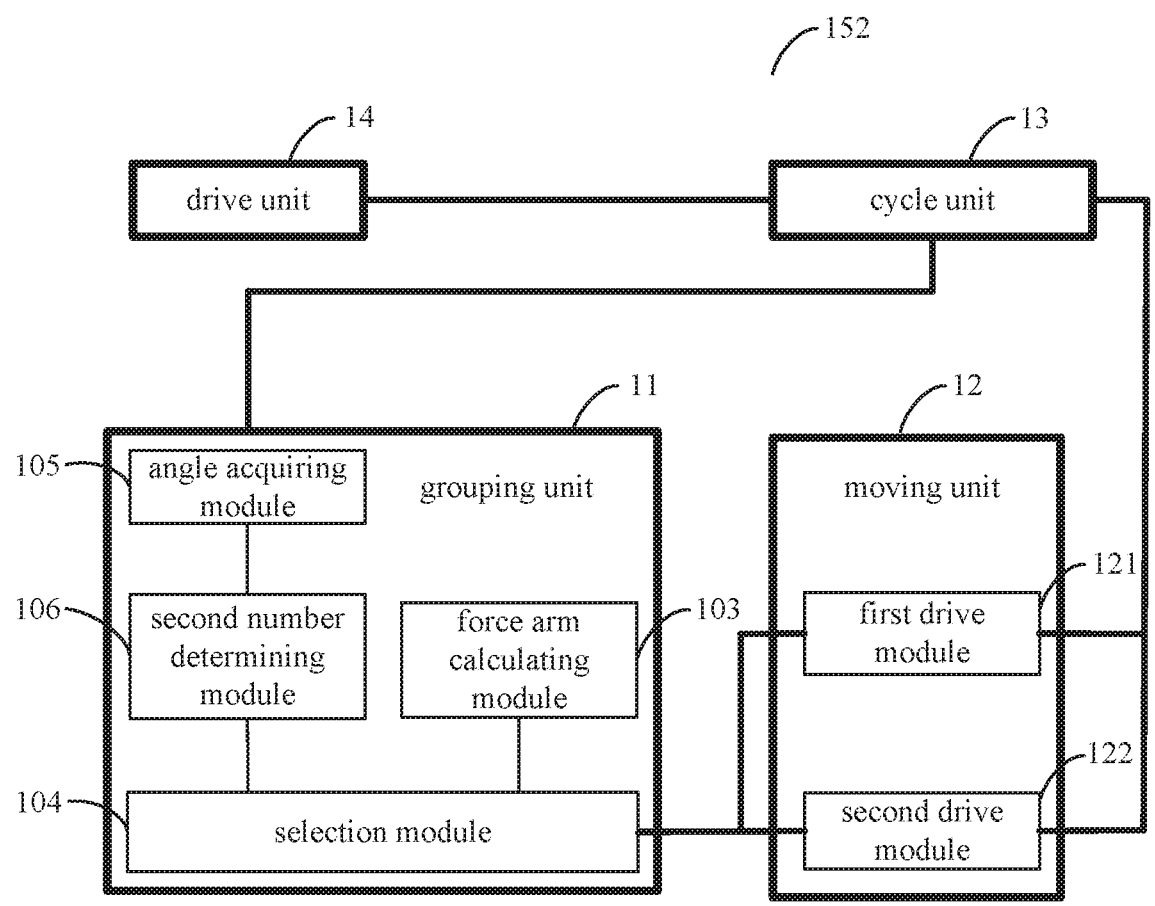
FIG. 15c is a block diagram showing the structure of the control device 152 according to another embodiment of the present application.

Another preferred embodiment of the control device 152 is shown in FIG. 15*c*. It is different from FIG. 15*b* in that, the grouping unit 11 includes an angle acquiring module 105 and a second number determining module 106, and the angle acquiring module 105 is configured to acquire the rotation angle of the rotor 28 in the current state, and the second number determining module 106 is configured to determine the number of the rotating units 50 in each group based on the rotation angle of the rotor 28 in the current state.

Figure 15D:
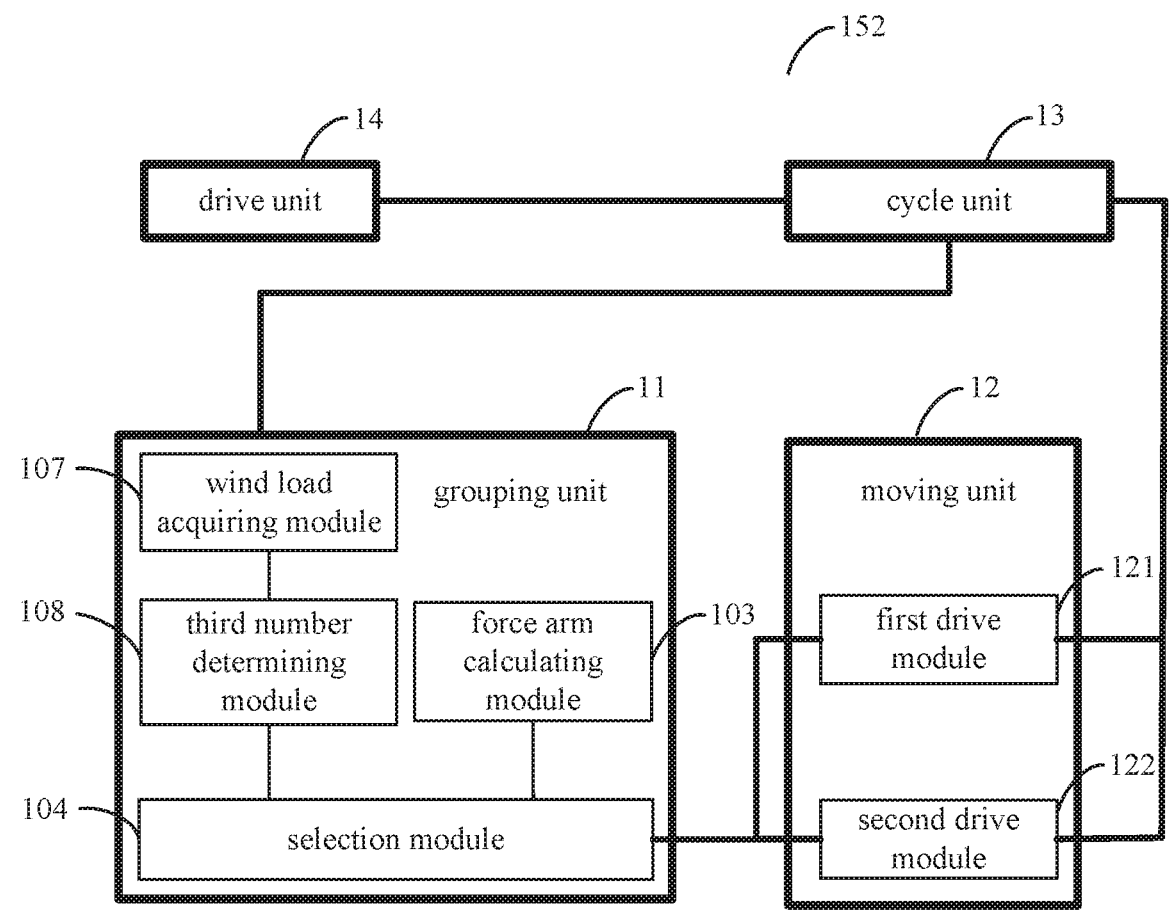
FIG. 15d is a block diagram showing the structure of the control device 152 according to a further embodiment of the present application.

Another preferred embodiment of the control device 152 is shown in FIG. 15*d*. It is different from FIG. 15*b* in that, the grouping unit 11 includes:

a wind load acquiring module 107 configured to acquire the rotation bending moment generated by the external wind load to the rotor 28, specifically, the wind load acquiring module 107 is configured to calculate based on the measured wind speed; and a third number determining module 108, which is configured to determine the number of the rotating units in each group based on the rotation angle of the rotor 28 in the current state in the case that the rotation bending moment generated by the wind load is within the preset range, and is configured to determine the number of the rotating units in each group based on the bending moment load to which the rotor is subjected in the current state in the case that the rotation bending moment generated by the wind load exceeds the preset range.

Figure 15E:
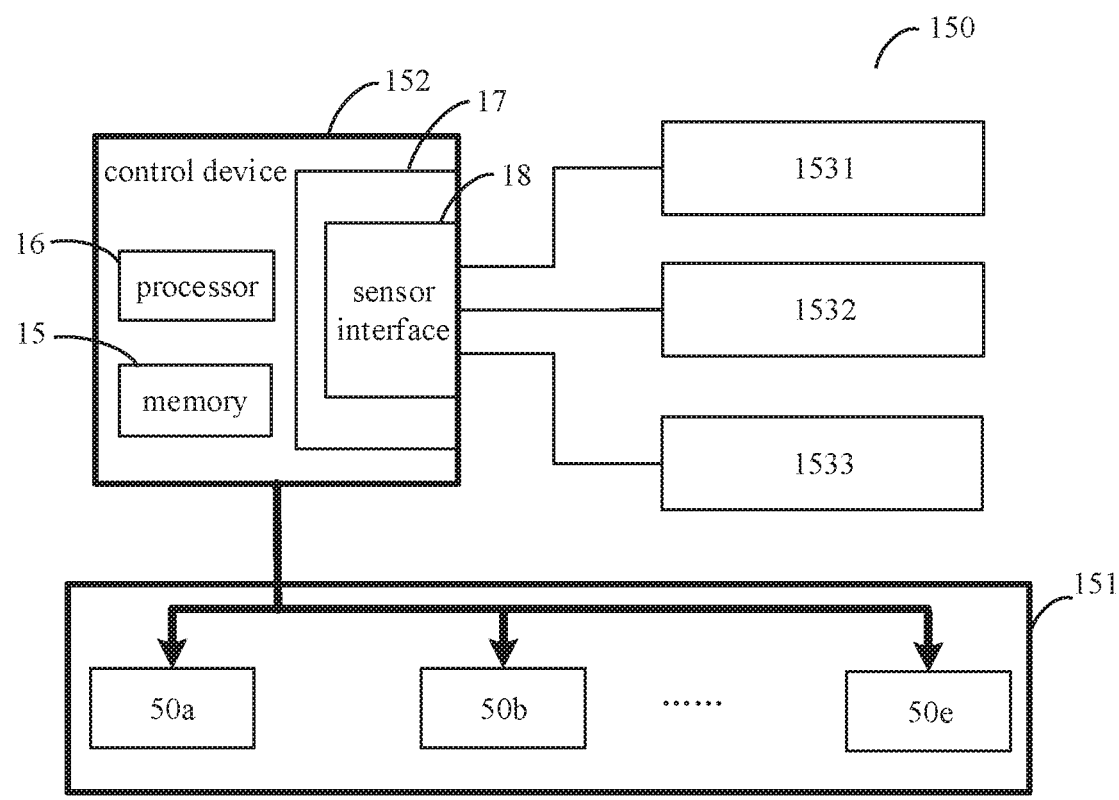
FIG. 15e is a block diagram showing the structure of the rotor rotating system according to another embodiment of the present application.

As shown in FIG. 15*e*, another preferred embodiment of the rotor rotating system of the present application is provided. This embodiment is different from FIG. 15*a* in that, the control device 152 may be a computer or other suitable processing units. Thus, in an embodiment, the control device 152 may include a number of suitable computer-readable instructions, and the instructions may configure, at runtime, the control device 152 to perform a variety of different functions.

As shown in FIG. 15*e*, the control device 152 includes a memory 15 and a processor 16. The memory 15 is configured to store execution instructions. The processor 16 is configured to call the execution instructions in the memory 15, to perform the steps as described in FIGS. 11 to 14 including, but not limited to, detecting the bending moment load to which the rotor 28 is subjected, detecting the rotation angle of the rotor 28 in the current state, calculating the rotation bending moment generated by the external wind load to the rotor 28, controlling at least two rotating units 50 to drive the rotor 28 to rotate with respect to the generator base 27, and performing a variety of other functions suitable for being implemented by a computer.

The processor 16 in this embodiment refers not only to an integrated circuit for computers in the conventional technology, but also to a controller, a microcontroller, a microcomputer, a programmable logic controller (PLC), an application specific integrated circuit, and other programmable circuits.

The memory 15 may typically include a storage element including, but not limited to, a computer-readable medium (e.g., a random access memory (RAM)), a computer-readable nonvolatile medium (e.g., a flash memory), a floppy disc, a compact disc read-only disc (CD-ROM), a magneto-optical disc (MOD), a digital versatile disc (DVD), and/or any other suitable storage element.

In addition, the control device 152 may further include a communication module 17, and the communication module 17 is configured to achieve communication between the control device 152 and the rotating units 50*a* to 50*e* and communication between the control device 152 and the angle detection unit 1531, the bending moment detection unit 1532, the wind load detection unit 1533.

Optionally, the communication module 17 further includes a sensor interface 18, so as to convert a signal transmitted by the angle detection unit 1531, the bending moment detection unit 1532, and the wind load detection unit 1533 into a signal that may be recognized and processed by the processor 16.

It should be understood that the angle detection unit 1531, the bending moment detection unit 1532, and the wind load detection unit 1533 may communicate with the communication module 17 in any suitable manners. For example, as shown in FIGS. 15*a* and 15*e*, the respective detection units are connected to the sensor interface 18 via wired connection. However, in other embodiments, the respective detection units may be connected to the sensor interface 18 via wireless connection using any known suitable wireless communication protocols, for example, Wireless Fidelity (WIFI), Worldwide Interoperability for Microwave Access (WIMAX), ZIGBEE, Wireless Local Area Network (WLAN), Bluetooth communication, and infrared transmission and so on.

It is to be noted that, for simplicity of description, each of the embodiments of the methods described before are described as a combination of a series of actions, however, the person skilled in the art should know that the present application is not limited by the sequence of the actions described, since according to the present application, some steps may be performed in other sequences or at the same time. Moreover, the person skilled in the art should also know that, all the embodiments described in the specification are preferred embodiments, and the actions and modules involved are not always necessary for the present application.

In the above embodiments, description of the embodiments are emphasized at respective aspects, and for the part not described in detail in a certain embodiment, reference may be made to related description of other embodiments.

The control method and the control device for the rotor rotating device, and the rotor rotating system according to the present application are described in detail hereinabove. Specific examples are used herein to explain the principles and embodiments of the present application, and description of the above embodiments is merely for helping understand the methods of the present application and its core ideas.

Finally, it is to be noted that, the person skilled in the art may understand that, all or part of processes of the methods according to the embodiments described above may be carried out by a computer program instructing an associated hardware, and the program may be stored in a computer readable storage medium, and the program may, when executed, include process in the embodiments of the methods described above. The storage medium may be a magnetic disc, an optical disc, a read-only memory (ROM), or a random access memory (RAM) and so on.

Various functional units in the embodiments of the present application may be integrated in one processing module, or may be separate physical presences of the units, or two or more functional units may be integrated in one module. The above integrated module may be implemented in the form of hardware or in the form of software functional module. The integrated module may also be stored in one computer-readable storage medium if implemented in the form of the software functional module and sold or used as a stand-alone product. The storage medium mentioned above may be a read-only memory, a magnetic disc, or an optical disc.

In a preferred embodiment, a rotor rotating system for the wind power generator set is also provided according to the present application, which includes a bending moment load detection unit, an angle detection unit and a wind load detection unit, a memory, and one or more processors. One or more modules are stored in the memory and configured to be executed by the one or more processors. The one or more modules include a grouping module configured to perform step S100, a movement module configured to perform step S200, a cycling module configured to perform step S300, and a drive module configured to perform step S400.

In a preferred embodiment, a computer program product used in combination with the rotor rotating device of the wind power generator set is also provided according to the present application, and the computer program product includes a computer-readable storage medium and a computer program embedded in the computer-readable storage medium. The computer program includes instructions for performing steps S100, S200, S300 and S400.

It should be noted that, for the person skilled in the art, various improvements and modifications may be made to the present application without departing from the principles of the present application, and these improvements and modifications also fall within the scope of protection defined by the claims of the present application.

The invention claimed is:

1. A control method for a rotor rotating device, the rotor rotating device comprising at least two rotating units, and each of the at least two rotating units comprising a telescopic cylinder and a pin, wherein the control method comprises:
    a grouping step, dividing the at least two rotating units into two groups;
    a moving step, detaching each of pins of a first group of rotating units from a rotor first and then re-fixing each of the pins of the first group of rotating units to another position on the rotor, wherein pins of a second group of rotating units are maintained fixedly connected to the rotor during detached and re-fixed process of the pins of the first group of rotating units;
    repeating the grouping step and the moving step to allow the pins of all the rotating units to be re-fixed; and
    changing a state of each of telescopic cylinders of all the rotating units to drive the rotor to rotate with respect to a generator base.

2. The control method according to claim 1, wherein the grouping step comprises:
    acquiring a bending moment load to which the rotor is subjected in a current state; and
    determining the number of the rotating units in each group based on the bending moment load to which the rotor is subjected in the current state and a shear load of each pin.

3. The control method according to claim 1, wherein the grouping step comprises:
    acquiring a rotation angle of the rotor in a current state; and
    determining the number of the rotating units in each group based on the rotation angle of the rotor in the current state.

4. The control method according to claim 1, wherein the grouping step comprises:
    acquiring a rotation bending moment generated on the rotor by an external wind load; and
    determining the number of the rotating units in each group based on a rotation angle of the rotor in a current state in the case that the rotation bending moment generated by the wind load is within a preset range, and determining the number of the rotating units in each group based on the rotation bending moment to which the rotor is subjected in the current state in the case that the rotation bending moment generated by the wind load exceeds the preset range.

5. The control method according to claim 2, wherein the grouping step further comprises:
    calculating a force arm of the pin of each of the rotating units to a rotation center of the rotor; and
    selecting the rotating units as the first group of rotating units and the second group of rotating units according to the number of the rotating units in each group, and allowing the sum of the force arms of the pins of the rotating units in the first group of rotating units to the rotation center of the rotor to be the smallest.

6. The control method according to claim 5, wherein the rotor rotating device comprises a first rotating unit, a second rotating unit, a third rotating unit, a fourth rotating unit, and a fifth rotating unit provided along a semi-annular circumference in sequence, wherein in the grouping step:
    the third rotating unit constitutes the first group of rotating units, and the first rotating unit, the second rotating unit, the fourth rotating unit and the fifth rotating unit constitute the second group of rotating units; or
    the second rotating unit and the third rotating unit constitute the first group of rotating units, and the first rotating unit, the fourth rotating unit and the fifth rotating unit constitute the second group of rotating units; or
    the third rotating unit and the fourth rotating unit constitute the first group of rotating units, and the first rotating unit, the second rotating unit and the fifth rotating unit constitute the second group of rotating units; or
    the second rotating unit, the third rotating unit and the fourth rotating unit constitute the first group of rotating units, and the first rotating unit and the fifth rotating unit constitute the second group of rotating units.

7. The control method according to claim 5, wherein the moving step comprises:
    driving the pins of the first group of rotating units to disengage from pin holes of the rotor, and maintaining the pins of the second group of rotating units fixedly connected to the rotor; and
    driving each of the telescopic cylinders of the first group of rotating units to retract or extend so as to allow each of the pins of the first group of rotating units to be moved to and re-fixed to another pin hole in the rotor.

8. A control device for a rotor rotating device, the rotor rotating device comprising at least two rotating units, and each of the at least two rotating units comprising a telescopic cylinder and a pin, wherein the control device comprises:

a grouping unit configured to divide the at least two rotating units into two groups;

a moving unit configured to control each of pins of a first group of rotating units to allow each of the pins of the first group of rotating units to be detached from a rotor first and then re-fixed to another position on the rotor, wherein pins of a second group of rotating units are maintained fixedly connected to the rotor during detached and re-fixed process of the pins of the first group of rotating units;

a cycle unit configured to repeatedly call the grouping unit and the moving unit to allow the pins of all the rotating units to be re-fixed; and a drive unit configured to change a state of each of telescopic cylinders of all the rotating units in order to drive the rotor to rotate with respect to a generator base.

9. The control device according to claim 8, wherein the grouping unit comprises:

a bending moment acquiring module configured to acquire a bending moment load to which the rotor is subjected in a current state; and a first number determining module configured to determine the number of the rotating units in each group based on the bending moment load to which the rotor is subjected in the current state and a shear load of each pin.

10. The control device according to claim 8, wherein the grouping unit comprises:

an angle acquiring module configured to acquire a rotation angle of the rotor in a current state; and a second number determining module configured to determine the number of the rotating units in each group based on the rotation angle of the rotor in the current state.

11. The control device according to claim 8, wherein the grouping unit comprises:

a wind load acquiring module configured to acquire a rotation bending moment generated on the rotor by an external wind load; and a third number determining module, which is configured to determine the number of the rotating units in each group based on a rotation angle of the rotor in a current state in a case that the bending moment generated by the wind load is within a preset range, and is configured to determine the number of the rotating units in each group based on a bending moment load to which the rotor is subjected in the current state in a case that the rotation bending moment generated by the wind load exceeds the preset range.

12. The control device according to claim 9, wherein the grouping unit further comprises:

a force arm calculating module configured to calculate a force arm of each of the pins of the rotating units to a rotation center of the rotor; and a selection module which is configured to select the rotating units as the first group of rotating units and the second group of rotating units according to the number of the rotating units in each group and is configured to minimize the sum of the force arms of the pins of the rotating units in the first group of rotating units to the rotation center of the rotor.

13. The control device according to claim 12, wherein the rotor rotating device comprises a first rotating unit, a second rotating unit, a third rotating unit, a fourth rotating unit, and a fifth rotating unit which are provided along a semi-annular circumference in sequence, wherein in a grouping step:

the third rotating unit constitutes the first group of rotating units, and the first rotating unit, the second rotating unit, the fourth rotating unit and the fifth rotating unit constitute the second group of rotating units; or the second rotating unit and the third rotating unit constitute the first group of rotating units, and the first rotating unit, the fourth rotating unit and the fifth rotating unit constitute the second group of rotating units; or the third rotating unit and the fourth rotating unit constitute a first group of rotating units, and the first rotating unit, the second rotating unit and the fifth rotating unit constitute the second group of rotating units; or the second rotating unit, the third rotating unit and the fourth rotating unit constitute the first group of rotating units, and the first rotating unit and the fifth rotating unit constitute the second group of rotating units.

14. The control device according to claim 12, wherein the moving unit comprises:

a first drive module configured to drive each of the pins of the first group of rotating units to disengage from a pin hole of the rotor, wherein the pins of the second group of rotating units are maintained fixedly connected to the rotor; and a second drive module configured to drive the telescopic cylinders of the first group of rotating units to retract or extend so as to allow each of the pins of the first group of rotating units to be moved to and fixed to another pin hole in the rotor.

15. The control device according to claim 10, wherein the grouping unit further comprises:

a force arm calculating module configured to calculate a force arm of each of the pins of the rotating units to a rotation center of the rotor; and a selection module which is configured to select the rotating units as the first group of rotating units and the second group of rotating units according to the number of the rotating units in each group and is configured to minimize the sum of the force arms of the pins of the rotating units in the first group of rotating units to the rotation center of the rotor.

16. The control device according to claim 11, wherein the grouping unit further comprises:

a force arm calculating module configured to calculate a force arm of each of the pins of the rotating units to a rotation center of the rotor; and a selection module which is configured to select the rotating units as the first group of rotating units and the second group of rotating units according to the number of the rotating units in each group and is configured to minimize the sum of the force arms of the pins of the rotating units in the first group of rotating units to the rotation center of the rotor.

17. A rotor rotating system, comprising:

a rotor rotating device, and a control device, wherein:

the rotor rotating device comprises at least two rotating units, each of the at least two rotating units comprising a telescopic cylinder and a pin, the pin being arranged at a movable end of the telescopic cylinder of the respective rotating unit and being disengageably fixed to a rotor; and the control device comprises:

a grouping unit configured to divide the at least two rotating units into two groups;

a moving unit configured to control each of pins of a first group of rotating units to allow each of the pins of the first group of rotating units to be detached from the rotor first and then re-fixed to another position on the rotor, wherein pins of a second group of rotating units are maintained fixedly connected to the rotor during detached and re-fixed process of the pins of the first group of rotating units;

a cycle unit configured to repeatedly call the grouping unit and the moving unit to allow the pins of all the rotating units to be re-fixed; and a drive unit configured to change a state of each of telescopic cylinders of all the rotating units in order to drive the rotor to rotate with respect to a generator base.

18. The rotor rotating system according to claim 17, further comprising:

a bending moment load detection unit which comprises a pressure sensor provided on at least one pin of the at least two rotating units, wherein the pressure sensor is configured to detect a shear force to which the at least one pin is subjected;

an angle detection unit which comprises a rotation angle measurer provided on the rotor, wherein the rotation angle measurer is configured to detect a rotation angle of the rotor in a current state; and/or a wind load detection unit which comprises an anemoscope, wherein the anemoscope is configured to measure an external wind speed.

* * * * *